US009280716B2

(12) United States Patent
Yamaguchi

(10) Patent No.: US 9,280,716 B2
(45) Date of Patent: Mar. 8, 2016

(54) APPARATUS FOR SENSING USER CONDITION TO ASSIST HANDWRITTEN ENTRY AND A METHOD THEREFOR

(75) Inventor: Tokuo Yamaguchi, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 610 days.

(21) Appl. No.: 13/064,406

(22) Filed: Mar. 23, 2011

(65) Prior Publication Data

US 2011/0235915 A1    Sep. 29, 2011

(30) Foreign Application Priority Data

Mar. 24, 2010 (JP) .................................. 2010-067697
Dec. 28, 2010 (JP) .................................. 2010-293057

(51) Int. Cl.
| G06K 9/00 | (2006.01) |
| G06K 9/20 | (2006.01) |
| G06F 3/01 | (2006.01) |
| G06F 3/033 | (2013.01) |
| G06F 3/042 | (2006.01) |
| G06F 3/0488 | (2013.01) |

(52) U.S. Cl.
CPC .............. *G06K 9/2081* (2013.01); *G06F 3/011* (2013.01); *G06F 3/0334* (2013.01); *G06F 3/0425* (2013.01); *G06F 3/04883* (2013.01); *G06K 9/00335* (2013.01); *G06K 2209/01* (2013.01)

(58) Field of Classification Search
None
See application file for complete search history.

(56) References Cited

U.S. PATENT DOCUMENTS

| 6,081,261 A * | 6/2000 | Wolff et al. ................... 345/179 |
| 6,611,259 B1 * | 8/2003 | Tillgren et al. ............... 345/179 |
| 2003/0112220 A1 * | 6/2003 | Yang et al. .................... 345/156 |
| 2004/0239534 A1 * | 12/2004 | Kushler et al. .................. 341/28 |
| 2005/0262429 A1 * | 11/2005 | Elder et al. ..................... 715/507 |
| 2008/0063363 A1 * | 3/2008 | Kientz et al. .................... 386/95 |
| 2008/0264701 A1 * | 10/2008 | Radtke et al. ............. 178/19.01 |
| 2009/0030345 A1 * | 1/2009 | Bonnet et al. ................. 600/587 |
| 2010/0210359 A1 * | 8/2010 | Krzeslo et al. .................. 463/31 |

FOREIGN PATENT DOCUMENTS

| EP | 645731 B1 * | 3/2000 |
| JP | 1100672 A | 4/1989 |
| JP | 6176015 A | 6/1994 |
| JP | 2002-023938 A | 1/2002 |
| JP | 2006-163911 A | 6/2006 |
| JP | 2007-293659 A | 11/2007 |
| JP | 2008-234401 A | 10/2008 |

* cited by examiner

*Primary Examiner* — Aaron W Carter
(74) *Attorney, Agent, or Firm* — Rabin & Berdo, P.C.

(57) ABSTRACT

In an entry assistance apparatus, when the user makes handwritten entry on a medium, a detector detects person condition information on a condition regarding the body of the user. The person condition information may include either or both of positional information on the position of the user and postural information on the posture of the user. Based on the person condition information, a condition estimator estimates one or more conditions of the user. Based on the condition of the user, a presentation information selector selects presentation information on one or more information contents to be presented to the user. The information content indicated by the presentation information will be presented to the user by an information presenter.

16 Claims, 14 Drawing Sheets

| CONDITION 1 | CONDITION 2 | CONDITION 3 | ... | ESTIMATED CONDITION |
|---|---|---|---|---|
| T | F | F | ... | ENTRY IS STARTED |
| T | T | F | ... | PUZZLED AS TO WHICH PAPER FORM SHEET SHOULD BE SELECTED |
| T | F | T | ... | PUZZLED AS TO WHICH FORM FIELD ENTRY SHOULD BE MADE |
| ... | ... | ... | ... | ... |

| CONDITION ID | TYPE OF PRESENTATION INFORMATION | FILE NAME | SPECIFIED DISPLAY SECTION | PRIORITY |
|---|---|---|---|---|
| 1 | MESSAGE | a001.jpg | (0,200,400,1000) | 3 |
| 2 | ALERTING | a002.jpg | (300,400,600,800) | 3 |
| 3 | MESSAGE | a003.jpg | – | 2 |
| ... | ... | ... | ... | ... |

FIG. 10

| HEAD POSITION (AMOUNT OF FORWARD LEANING HELD AT LARGE, MIDDLE, OR SMALL) | MOVING SPEED OF HEAD | ACCELERATION IN MOVEMENT OF HEAD | NUMBER OF OBSERVATIONS OF AMOUNT OF FORWARD LEANING EQUAL TO MIDDLE OR MORE | POSTURAL INFORMATION ON PERSON |
|---|---|---|---|---|
| MIDDLE OR MORE | HIGH OR MORE | LOW OR MORE | 0 OR MORE | TILTED QUICKLY |
| MIDDLE OR MORE | LOW OR MORE | LOW OR MORE | 0 | TILTED FOR THE FIRST TIME |
| MIDDLE OR MORE | LOW OR MORE | LOW OR MORE | THRESHOLD VALUE α OR MORE | SLOWLY TILTED PLURAL TIMES |
| ... | ... | ... | ... | ... |

FIG. 15

| USER ATTRIBUTE 1 | USER ATTRIBUTE 2 | TIME OF DAY | CONDITION ID |
|---|---|---|---|
| 20-30 YEARS OLD | MAN | 10-11 O'CLOCK | 3 |
| 30-40 YEARS OLD | WOMAN | 14-15 O'CLOCK | 2 |
| 40-50 YEARS OLD | WOMAN | 9-10 O'CLOCK | 2 |
| ... | ... | ... | ... |

210

APPARATUS FOR SENSING USER CONDITION TO ASSIST HANDWRITTEN ENTRY AND A METHOD THEREFOR

RELATED APPLICATIONS

The present patent application claims Convention priorities based upon Japanese patent application Nos. 2010-067697 and 2010-293057 filed in Japan on Mar. 24 and Dec. 28, 2010, respectively, the entire disclosure of which, including the specifications, claims, accompanying drawings and abstracts of the disclosure, is incorporated herein by reference in its entirety.

BACKGROUND OF THE INVENTION

1. Field of the Invention

The present invention relates to an entry assistance apparatus, and more particularly an apparatus for assisting the user in making handwritten entry. The present invention also relates to a method in the apparatus.

2. Description of the Background Art

Computers, such as personal computers, and input devices, such as a control panel having a touch screen, allowing the users to manipulate the display screen have heretofore broadly spread. Concomitantly, the method of inputting letters and characters by the users has become more diversified. On the other hand, there still exist occasions in which the users write letters or characters by hand in order to enter the handwritten letters or characters on paper media. For example, the users may fill in paper forms prepared in shops of financial organizations, such as banks.

Under those circumstances, various solutions have been developed for processing the input of handwritten letters and characters the users provide. One of the solutions for alleviating the loads and burden imposed when handwritten letters and characters are electronically recognized or imposed on clerical processing in financial organizations is taught by Japanese patent laid-open publication No. 100672/1989 to Karahashi et al. A solution for detecting the position and angle of the sections or items on an input menu sheet for use in electronically entering characters put on the tablet of a handwritten character recognizer to thereby recognize the characters entered is disclosed by Japanese patent laid-open publication No. 2002-23938 to Mori.

Solutions for assisting the users in inputting document data have also been developed. A solution for assisting the users in producing documents having its format predetermined to include items to be filled in is disclosed in Japanese patent laid-open application No. 176015/1994 to Ishihara.

As disclosed by Karahashi et al., and Mori indicated above, the conventional solutions for processing handwritten characters the users provide intend to reduce the load imposed when the electronic equipment recognizes the user's handwritten characters by means of a digital input method using a control panel and a cursor manipulator or touch pen.

When the user or customer fills in a paper form sheet (paper medium) in a shop of a financial organization, the form may include plural items that the user has to fill in, as well as examples of entry and notanda which may often be cumbersome. That may often cause the user not to easily find out information necessary to make the entry.

However, those conventional solutions for processing the input of handwritten letters and characters the users provide are not designed to assist the users when writing text by hand. Therefore, if such conventional solutions for processing the input of handwritten letters and characters the users provide are used, it would be impossible to improve the convenience of the users when entering letters or characters through handwriting on recording media.

The conventional solutions for processing the input of handwritten letters and characters the users provide thus rely upon a digital input method by means of a control panel or a cursor pen. It would therefore be difficult to apply those conventional solutions to the users when writing on a paper medium by hand.

In the conventional solution for assisting user's input disclosed in Ishihara indicated above, when the user selects a message or exemplary sentence corresponding to items to be filled out as appropriate, information content assisting the user in inputting the selected message or exemplary sentence is displayed on the display screen.

However, in the conventional solutions for assisting the users in inputting letters or characters, information content necessary for such assistance would not be displayed on the display screen until they manipulate the machine in a prescribed manner. With those conventional solutions, burden is thus imposed on the users. Those solutions thus failed to improve the user's convenience.

SUMMARY OF THE INVENTION

It is therefore an object of the present invention to provide a novel, improved entry assistance apparatus and a method in the apparatus capable of enhancing the convenience of the users when making handwritten entry.

In accordance with the present invention, an entry assistance apparatus for assisting the user in making handwritten entry on a recording medium comprises: a detector for detecting person condition information on a condition regarding the body of the user, the person condition information including either or both of positional information on the position of the user and postural information on the posture of the user; a condition estimator for estimating one or more conditions of the user based on the person condition information; a presentation information selector for selecting, based on the condition of the user, presentation information on one or more information contents to be presented to the user; and an information presenter for presenting the content indicated by the presentation information to the user.

BRIEF DESCRIPTION OF THE DRAWINGS

The objects and features of the present invention will become more apparent from consideration of the following detailed description taken in conjunction with the accompanying drawings in which:

FIG. 3 schematically shows an example of data stored in a table and is useful for understanding an example of estimation process performed by the entry assistance apparatus shown in FIG. 2;

FIG. 4 schematically shows an example of presentation information stored in a table of the database in the illustrative embodiment shown in FIG. 2;

FIG. 10 illustrate, in the form of table, another example of processing states useful for understanding the detection of postural information in the entry assistance apparatus of the embodiment;

FIG. 15 schematically shows, like FIG. 4, one example of data stored in a table of the condition database in accordance with the alternative embodiment shown in FIG. 14;

DESCRIPTION OF THE PREFERRED EMBODIMENTS

Figure 1:
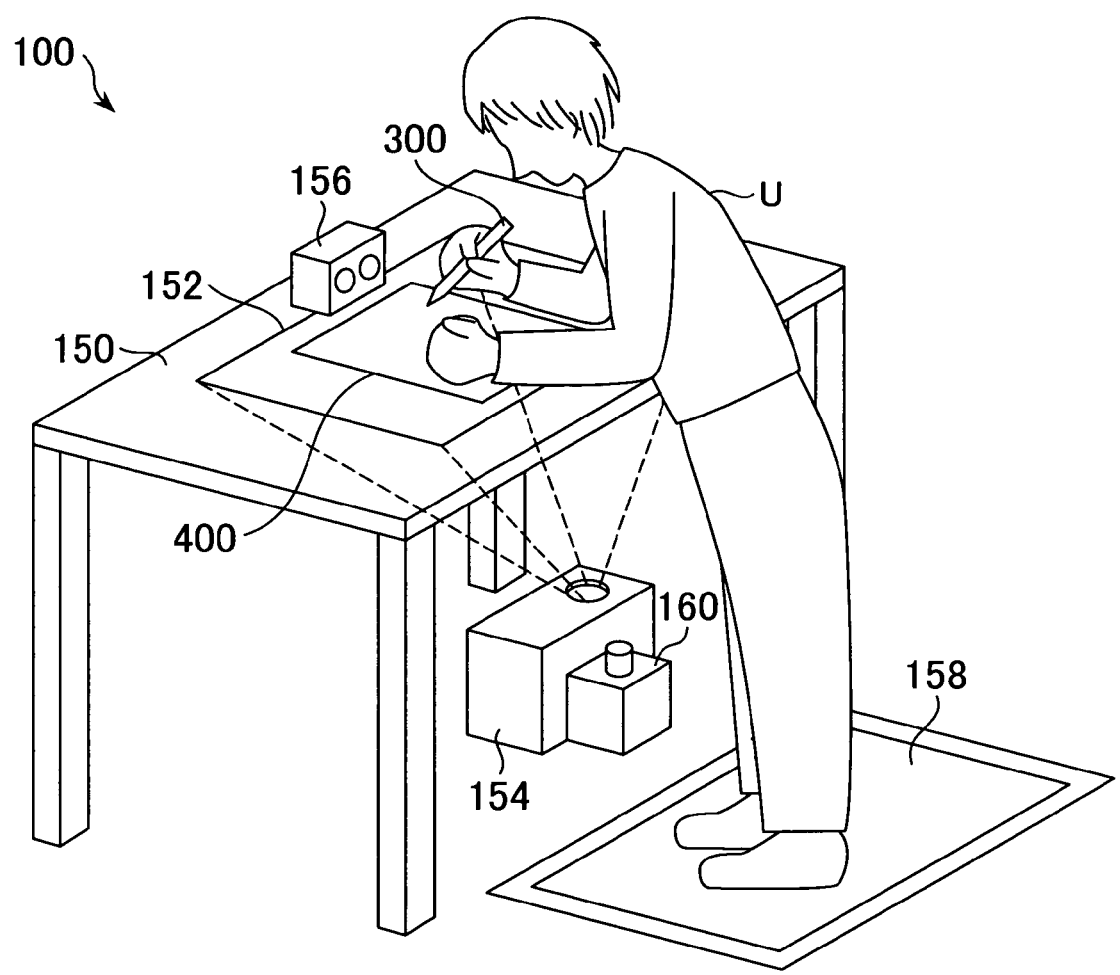
FIG. 1 is an explanatory perspective view of an entry assistance apparatus in accordance with a preferred embodiment of the present invention adapted to perform an exemplified processing.

Preferred embodiments of the present invention will be described in detail with reference to the accompanying drawings. Throughout the present specification and drawings, like components may be designated with the same reference numerals and their repetitive description may be refrained from.

With reference first to FIG. 1, a preferred embodiment of entry assistance apparatus 100 in accordance with the present invention may be configured in its appearance of hardware as shown in FIG. 1. Specifically, the entry assistance apparatus 100 may comprise a desk having its desktop surface 150, a display screen 152, a video projector 154, a range finder 156 adapted for measuring the distance to an object, a center of gravity (COG) sensor 158 adapted for measuring the position of the center of gravity of the user U, and a video pickup device 160 for sensing a shadow caused when the user U approaches the display screen 152.

FIG. 1 also depicts an input device or tool 300 in the form of pen, and a paper form sheet, or entry sheet, 400 onto which the user may make a handwritten entry by means of the input tool 300 and which is now placed on the desktop surface 150. The entry assistance apparatus 100 is adapted to detect entered-content information by sensing the entry point of the input tool 300 by means of infrared camera or cameras 140, FIG. 2, as will be described later on. It is to be noted that the hardware structure of the entry assistance apparatus 100 may not be restricted to the specific configuration thus shown in the figure.

Now, a brief reference will be made to FIG. 2, which is a schematic block diagram showing the example of system configuration of the entry assistance apparatus 100. The entry assistance apparatus 100 may generally comprise a detector section 102, a condition estimator section 104, a presentation information selector 106, an information presenter 108 and a system controller 130, which are interconnected as depicted by interconnections 132, 134, 136 and 138.

The illustrative embodiment of the entry assistance apparatus 100 is depicted and described as configured by separate functional blocks as described above. It is however to be noted that such a depiction and a description do not restrict the apparatus 100 to an implementation only in the form of hardware but the apparatus 100 may partially or entirely be implemented by software, namely, by a computer, or processor system, which has a computer program installed and functions, when executing the computer program, as part of, or the entirety of, the apparatus 100, as will be described later on. That may also be the case with alternative embodiments which will be described below. In this connection, the word "circuit", "section" or "unit" may be understood not only as hardware, such as an electronics circuit, but also as a function that may be implemented by software installed and executed on a computer.

The system controller 130, which may be implemented by an MPU (Micro-Processing Unit) or an integrated circuit for implementing various functions, is interconnected to constituent elements of the entry assistance apparatus 100 as symbolically depicted with the connection 138, and adapted to generally and systematically control the entire entry assistance apparatus 100. The system controller 130 may also be adapted to serve to perform processing associated with presentation per se, the processing being conceptually depicted by the functional blocks, such as the condition estimator section 104 and the presentation information selector 106 of the apparatus 100.

In addition to, or included in, the system controller 130, the entry assistance apparatus 100 may have a ROM (Read-Only Memory), a RAM (Random Access Memory), and other storages, if necessary, none of which are shown. The components of the apparatus 100 are interconnected by a bus or buses serving as data transmission channels, which are symbolically shown with interconnections 132, 134, 136 and 138 merely for illustration.

The ROM may be adapted to store program sequences controlling the system controller 130 and control data, such as arithmetic parameters. The RAM may be adapted to temporarily store program sequences currently executed by the system controller 130 together with data. The storages may be in the form incorporated in the entry assistance apparatus 100 and adapted to store applications and various data, which may also be stored in a presentation information database 124 described later, a condition database 210, FIG. 14, also described later, or other storages. Such storages may be, for example, of magnetic storage media, such as a hard disk, or of a nonvolatile memory, such as a flash-type memory, which will also be described later with reference to FIG. 17. It is to be noted that the hardware structure of the entry assistance apparatus 100 may not be restricted to the specific configuration shown described above.

Well, prior to describing the structure of the entry assistance apparatus 100 in accordance with the preferred embodiment, it will be described how illustrative embodiments assist the user in writing letters and characters by hand. In the following, it will specifically be described how the entry assistance apparatus 100 proceeds to entry assistance.

Specifically, merely for illustration purpose, an example is taken in which the user writes letters or characters by hand on a paper medium, e.g. fills out a blank form, placed on the desktop surface 150, FIG. 1, with aid of the entry assistance apparatus 100. In the invention, however, the subject to be assisted by the entry assistance apparatus 100 may not be limited to handwritten entry on paper media. The entry assistance apparatus 100 can assist the user in making a handwritten entry onto an image electronically displayed on the desktop surface 150, e.g. corresponding to a blank form.

Also, the subject of handwritten entry to be assisted by the entry assistance apparatus 100 may not be restricted to user's handwriting of actual letters or characters. The entry assistance apparatus 100 can assist the user in making a non-text entry, such as achieved by selecting one or more of plural choice items by means of, e.g. tipping or checking. In that context, the word "handwriting" may cover the possibility of such a non-textwise entry.

Further in the context, the term "character" may sometimes be comprehended broader as covering the possibility of not only character per se but also letter, mark, code, figure, symbol and sign. The term "input" may sometimes cover the possibility of electronically inputting information in a system as well as entering letters or characters, tipping or checking by handwriting on paper media, such as paper form sheets.

As described previously, in the conventional solutions for assisting the user in inputting data, information content for assisting the user would not be displayed on the display screen until he or she performs a prescribed action or manipulation. This places burden on the user. For this reason, the conventional solutions, if employed, would not ensure the convenience of the user.

When the user makes a handwritten entry in a shop of a financial organization, examples of characters that are asked to be entered may often be items associated with his or her privacy, such as personal information. When the handwritten entry by the user is assisted, it is preferable from a privacy protection standpoint that the way of presenting information to the user or the information content be varied according to the information presented to the user in such a fashion that the content of information to be concealed is not displayed for the user or items associated with privacy are not audibly presented, for example.

The entry assistance apparatus 100 in accordance with the illustrative embodiment is adapted to assist the user in making a handwritten entry by estimating the condition of the user who makes handwritten entry and presenting information content corresponding to the result of the estimation to the user in a way appropriate for the result of the estimation. This makes it unnecessary for the user to perform any special action or manipulation for prompting the entry assistance apparatus 100 to provide a presentation. Thus, the entry assistance apparatus 100 does not impose burden on the user unlike the conventional solutions, hence further enhancing the convenience of the user.

Furthermore, the entry assistance apparatus 100 can present to the user such information content which assists the user in making a handwritten entry with his or her privacy protected.

An example of information to be presented to the user, or presentation information, by the entry assistance apparatus 100 in accordance with the illustrative embodiment to assist the user in making handwritten entry may include an image depicting examples of entry, or samples, which he or she should make on a paper medium. Another example may include text indicating items or notanda to be observed in making an entry. Further examples may include a picture indicating where an erroneous entry is made, and a variety of cautionary messages.

In the present invention, information to be presented, or presentation information may not be limited to data that are presented to the user when he or she is making a handwritten entry. The entry assistance apparatus 100 may be adapted to estimate that the user is puzzled about which of paper media to select into which he or she should make an entry so as to present to him or her message stating that the officer in charge will come. That message is one example of information content which is presented to the user before he or she makes handwritten entry. The entry assistance apparatus 100 may be adapted to estimate that the user has finished an entry to in turn present him of her a map image indicating where he or she should submit the filled-in paper medium. That is one example of information to be presented to the user after completion of his or her handwritten entry.

One example of the way of presenting information content to the user by the entry assistance apparatus 100 in accordance with the illustrative embodiment may include visually display of the information on a display unit 126, described later, included in the apparatus 100 or on a display device provided externally to the apparatus 100.

The present invention may not be restricted to the above-described specific method of presenting information in the illustrative embodiment. Various ways of presenting information which resort to any of the human five senses can be employed by the entry assistance apparatus 100 in accordance with the embodiment. For example, such information can be presented audibly, e.g. in the form of speech and/or music, or tactually, e.g. vibrationally, changing temperature or blowing air. The entry assistance apparatus 100 may be adapted to use parameters, such as the sound level and/or direction of a sound source to thereby audibly present information, or use parameters, such as the direction and/or time interval of vibration to thereby vibrationally present information. The entry assistance apparatus 100 may also be adapted to use the distribution of temperature on the desktop surface 150 as a parameter to thereby present information in terms of temperature, and/or use parameters, such as the force and direction of blowing wind to thereby present information in terms of wind blowing.

As described above, the entry assistance apparatus 100 serves as estimating the condition of the user who makes handwritten entry and presenting information content corresponding to the result of the estimation to the user in a way appropriate for the result of the estimation. Thus, when the user makes a handwritten entry, the apparatus 100 can enhance the convenience of the user.

Specifically, the entry assistance apparatus 100 improves the convenience of the user by performing the following processing starting with a detection process (1) and ending with a presentation process (4) as described below.

(1) Detection Process

The entry assistance apparatus 100 detects information for use in estimating the condition of the user who makes handwritten entry, such information being sometimes referred to as detection information. Such detection information may exemplarily, in the illustrative embodiment, be person condition information about the condition of the body of the user, and entry state information about the state of the entry made by the user either directly, i.e. electronically, onto a desktop surface, or onto a paper medium placed on the desktop surface. In the invention, detection information may not be limited to the above examples. The entry assistance apparatus 100 may be adapted to detect, when the user makes an entry onto a paper medium, i.e. fills in a paper form, placed on the desktop surface, information on the type of the paper medium, i.e. form sheet, from the paper medium as detection information (type-of-form information), which may be represented on the paper medium. Type-of-form information may be, in the embodiment, in the form of, for example, barcode, including QR code, recorded on paper media. In the invention, the way of appending type-of-form information to paper media may not be limited to the specific method described above.

The person condition information in the embodiment can be either or both of positional and postural information on the position and posture of the user, respectively. The entry assistance apparatus 100 can therefrom detect the position and/or posture of the user to thereby identify the physical condition of the user to be assisted. The apparatus 100 can therefore estimate, during an estimation process (2) described later, the condition of the user based on a condition corresponding to his or her physical condition thus identified.

Entry state information in the embodiment may be either or both of entry position information about a position on the desktop surface at which the user makes entry and entered-content information about the content of the entry made by the user. The entry assistance apparatus 100 can detect the position and/or content of the entry the user to be assisted makes on the desktop surface to thereby determine what he or she is entering at which position on the desktop surface or on the paper medium, namely his or her state of entry. Therefore, in the estimation process (2) described later, the entry assistance apparatus 100 can estimate the user's condition based on a condition corresponding to the identified state of entry. Furthermore, the assist apparatus 100 can use a paper medium placed on the desktop surface and identified on the basis of the type-of-form information detected from the paper medium and the result of the identification of the state of the entry made by the user to thereby determine whether or not the information entered by the user is erroneous in content.

In the detection process (1), the entry assistance apparatus 100 thus detects detection information as described previously. Detection information detected by the apparatus 100 may not be limited to including all person condition information, entry state information and type-of-form information. Rather, the apparatus 100 may be adapted to detect either one of the person condition information and entry state information as detection information. A specific method of detecting person condition, entry state and type-of-form information will be described later.

(2) Estimation Process

If detection information is detected in the detection process (1) described above, the entry assistance apparatus 100 then uses the detected detection information to estimate a single or plural conditions of the user who makes handwritten entry.

More specifically, the entry assistance apparatus 100 may use pieces of detected detection information independently of each other and/or in combination to thereby estimate one or plural conditions of the user. The apparatus 100 may be adapted to learn the results of estimation and use the results of the learning to provide estimates. Specific examples of the estimation process performed by the apparatus 100 will be described later.

The entry assistance apparatus 100 may be adapted to use person condition information or entry state information detected at plural instants of time in order to estimate the condition or conditions of the user, which is however not restrictive. The apparatus 100 can use plural pieces of person condition information or plural pieces of entry state information to thereby detect time-serial variation in person condition or entry state, and then use information about the detected time-serial variations to thereby estimate the condition or conditions of the user. The apparatus 100 may be adapted for carrying out, during the detection process (1), the aforementioned detection of information on time-serial variations. In the following, the illustrative embodiment will be described in which person condition information may contain information on time-serial variations in person condition, and entry state information may contain information on time-serial variations in entry state.

(3) Presentation Information Selecting Process

When the condition or conditions of the user are estimated in the estimation process (2), the entry assistance apparatus 100 decides or selects one or plural pieces of information to be presented, i.e. presentation information.

Figure 2:
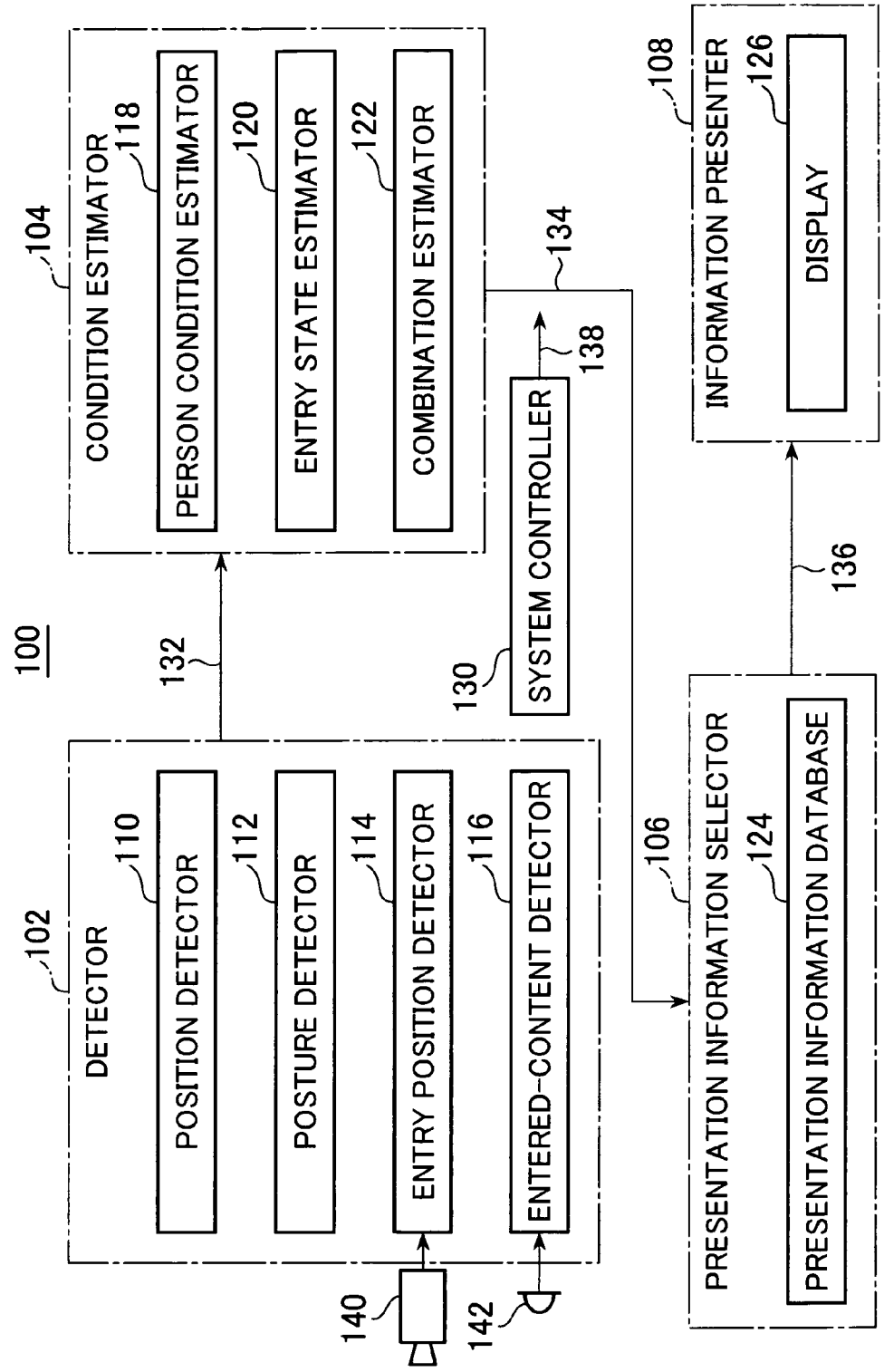
FIG. 2 is a schematic block diagram showing one example of configuration of the entry assistance apparatus of the illustrative embodiment shown in FIG. 1.

More specifically, the entry assistance apparatus 100 may use a presentation information database 124, FIG. 2, which has pieces of information on the content of, or indicated by, presentation information and a way of presentation stored in association with a result of estimation specified by, e.g. identification (ID), to thereby decide or select presentation information corresponding to the estimated condition or conditions of the user. Those pieces of information may be examples of presentation information. Examples of information about way of presentation, with the illustrative embodiment, may include textual data indicating messages to be presented to users, visual data representing still or motion pictures to be presented to users, and audio data representing speech signals to be presented to users. Information about the content of presentation may be information designating storage locations, such as file paths, at which the data are stored.

The of presentation information database may be adapted to place a priority for each estimation result such that the entry assistance apparatus 100 can adjust in the presentation process (4) described later the order and/or content of display based on the priorities so as to present information to users accordingly. The presentation information may not restrictively be provided by a specific type of database, such as a relational database (RDB).

(4) Presentation Process

If presentation information is thus decided in the selection process (3), the entry assistance apparatus 100 then uses the presentation information to thereby present to the user the content of, or designated by, the presentation information.

Where plural pieces of presentation information are selected and prioritized therebetween in the selection process (3) as described above, the entry assistance apparatus 100 may adjust, based on the priorities, and present to the user the order in which the pieces of information are to be presented to the user and/or the content of the presentation. More specifically, the apparatus 100 may present the content of, or designated by, the pieces of information to be presented to the user in the order of higher priority. If specified display sections for indicating the contents set by plural pieces of presentation information overlap with each other, the apparatus 100 may display the piece of presentation information having a higher priority in the specified display section with other pieces of presentation information lower in priority in display sections without overlapping with the specified section and with each other. If selected plural pieces of presentation information have the same priority as each other, the entry assistance apparatus 100 preferentially displays a piece of presentation information having its identification, e.g. represented in number, smaller and showing the results of the estimation. The invention may not be restricted to the specific process, described above, performed when pieces of presentation information are prioritized.

The entry assistance apparatus 100 may perform the above-described processing starting with the detection process (1) and ending with the presentation process (4) as a specifically exemplified method of presentation in the illustrative embodiment. Those processes may thus render the entry assistance apparatus 100 estimating the conditions of the user who makes handwritten entry, and presenting information content corresponding to the result of estimation to the user in a way appropriate for the result of estimation. The entry assistance apparatus 100 can thus enhance the convenience of the user by carrying out the sequence of operation staring with the detection process (1) and ending with the presentation process (4).

Reference will be made again to FIG. 2 to further describe in detail the example of configuration of the entry assistance apparatus 100, which is adapted for performing the aforementioned processes of presentation. In the following description, an example is taken in which the apparatus 100 assists the user U in making handwritten entry on a utility table or at a wicket in a financial organization or public institution. In the context, the word "user" may broadly cover the possibility of costumer, operator, student, and so on, who may use the apparatus 100 in a variety of applications. In the invention, the entry assistance apparatus 100 may, of course, not be limited to such a specific application.

As shown in FIG. 1, the entry assistance apparatus 100 is equipped with the range finder 156, COG sensor 158 and video pickup device 160, which may in cooperation serve as part of the detector section 102. From a systematic viewpoint, as shown in FIG. 2, the detector section 102 comprises a position detector 110, a posture detector 112, an entry position detector 114, and an entered-content detector 116, which are adapted to play a leading role in performing the detection process (1) described above.

The position detector 110 may include an array of cameras or pressure sensors, adapted to sense the position of the user to produce positional information, which may be referred to as detection of positional information. The range finder 156, FIG. 1, acts as the position detector 110. The posture detector 112 may include a laser range finder, which is adapted to sense the posture of the user to produce postural information, which may be referred to as detection of postural information. The COG sensor 158, FIG. 1, acts as the posture detector 112. Thus, the position detector 110 and the posture detector 112 function as producing person condition information.

FIG. 2 merely shows one example of detector section 102 adapted to sense both positional and postural information. The invention may not be restrictive to the specific configuration of the detector section 102 described above. The entry assistance apparatus 100 may comprise none of the position detector 110 and the posture detector 112, i.e. designed not to detect person condition information. It is also possible that the detector section 102 may have either one of the position detector 110 and the posture detector 112, i.e. designed to detect either one of positional and postural information.

The present invention may not be restrictive to the specific configuration of the position detector 110 and the posture detector 112 described above. The entry assistance apparatus 100 can be equipped with the position detector 110 including any arbitrary device or a combination of such devices capable of identifying the position of the user. The apparatus 100 can also be equipped with the posture detector 112 including any arbitrary device or a combination of such devices capable of identifying the posture of the user.

In the illustrative embodiment, the video pickup device 160, FIG. 1, is provided for sensing a shadow caused when the user U approaches the display screen 152 so as to function as the entry position detector 114. In addition to or in place of the video pickup device 160, the entry position detector 114 may include an infrared camera or cameras 140, which are adapted to sense an entry point of an input tool 300, which the user uses for handwritten entry to produce entry position information, which may be referred to as detection of entry position information. With the illustrative embodiment, the input tool may exemplarily be a pen, pencil or stylus, and the entry point may be the tip of the pen, pencil or stylus. The entry position detector 114 may be adapted to read a barcode attached to a paper medium, such as a paper form sheet, placed on the desktop surface to produce type-of-form information.

The entered-content detector 116 may comprise an ultrasonic sensor and/or an infrared sensor 142, which are adapted to detect the content of an entry made by the user to produce entered-content information, which may be referred to as detection of entered-content information. The entered-content detector 116 may be implemented by a character-recognition system using ultrasonic waves and infrared rays in combination to detect the content of the entry made by the user, the invention not being limitative to such a specific configuration. The entered-content detector 116 in accordance with the embodiment can be so configured into an arbitrary system capable of detecting the content of a handwritten entry made by the user.

More specifically, with the illustrative embodiment, the entry position detector 114 and the entered-content detector 116 are designed to produce entry state information. FIG. 2 thus exemplarily shows the detector section 102 adapted for detecting both entry position information and entered-content information, but the invention may not be limitative to the specific configuration of the detector section 102. The entry assistance apparatus 100 can be equipped with neither the entry position detector 114 nor the entered-content detector 116, i.e. designed not to detect entry state information. The apparatus 100 may be equipped with either one of the entry position detector 114 and the entered-content detector 116 to detect one of entry position information and entered-content information.

The detector section 102 thus includes the position detector 110, posture detector 112, entry position detector 114 and entered-content detector 116 to thereby perform the detection process (1) described above. The detector section 102 in accordance with the embodiment can be so configured that the sensors are shared by those components forming the detector section 102.

The condition estimator section 104 may comprise a person condition estimator 118, an entry state estimator 120 and a combination estimator 122, which are adapted to perform the estimation process (2) described above. Specifically, the condition estimator section 104 is adapted to be responsive to the detection information 132 transferred from the detector section 102 to estimate one or more conditions of the user who makes handwritten entry to in turn transfer identification information on the result of the estimation 134 to the presentation information selector 106. In the following, identification information may be referred to as "condition identification (ID)". Information, signals or data are designated with reference numerals of connections on which they are conveyed.

The person condition estimator 118 functions to use person condition information relating to the condition or conditions of the body of the user and transferred from the detector section 102 to thereby estimate the condition or conditions of the user.

The person condition estimator 118 functions as estimating, when the position of the user indicated by the transferred positional information does not lie within a predetermined range, that the position of the user is off his or her normal entry position. In such a condition, the entry assistance apparatus 100 will provide a presentation such as to guide the user to the predetermined range. When the transferred postural information indicates that the user tilted his or her head several times, the person condition estimator 118 estimates that he or she is searching for an officer in charge. In such a condition, in order to inform an officer in charge that the user is searching for an officer, the entry assistance apparatus 100 provides a visual notice by lighting a lamp on, or provides an audible notice in oral or sound. When a visual or audible notice is provided as described as above, the entry assistance apparatus 100 additionally gives a notice to that effect to the user. When transferring the positional and postural information, the person condition estimator 118 can provide estimates independently based on the positional and postural information of each other. Alternatively, the estimates can also be provided by combining the positional and postural information with each other. The invention may not be limitative to the specific way of estimation provided by the person condition estimator 118 described above.

The entry state estimator 120 serves to use entry state information on the state of the entry, transferred from the detector section 102, to estimate the condition of the user.

When the entry position indicated by the entry position information transferred is not in a predetermined range, the entry state estimator 120 estimates that the user stays out of his or her entry position. In that case, the entry assistance apparatus 100 provides an error or warning message to the user. The entry state estimator 120 can also use the detected type-of-form information to estimate whether or not the entry position is off the fill-in columns on the paper form. The estimator 120 uses the entered-content information transferred to estimate whether or not the entered content is erroneous. When the user has written his or her address erroneously, for example, when the address includes a written content not matching any geographical name actually existing, the estimator 120 estimates that the entered content is in error. In that case, the entry assistance apparatus 100 presents an error or warning message to the user. The entry state estimator 120 may be adapted to provide, when supplied with entry position and content information, estimates independently based on those two types of information of each other as described above. Alternatively, it is also possible to provide estimates by combining the entry position and content information with each other. The invention may not be restrictive to the specific estimates, described above, provided by the entry state estimator 120.

The combination estimator 122 functions to be responsive to the person condition and entry state information to provide an estimate of the condition of the user.

When the postural information indicates the position of the center of gravity, the combination estimator 122 determines the position of the center of gravity and its dispersion with respect to predetermined threshold values to determine how much the user leans forward, i.e. the degree of forward leaning of the user. For example, the degree may be classified into three levels: high, moderate and low. The estimator 122 uses the identified degree of forward leaning of the user, the position of the user indicated by the positional information, and the entry position indicated by the entry position information to estimate into which fill-in column on the desktop surface 150 the user is making an entry. In addition, the combination estimator 122 can also use the detected type-of-form information to estimate into which fill-in column on the paper form placed on the desktop surface 150 the user is making an entry.

The combination estimator 122 may be adapted to further use, if the estimator 122 estimates that the entered content is in error based on the entered-content information, the degree of forward leaning of the user to provide an estimate of the condition of the user. In that case, if the amount of forward leaning of the user is larger, then the combination estimator 122 estimates that the user is unconscious of the entry error, i.e. in the condition that the user needs to be alerted. By contrast, when the amount of forward leaning of the user is smaller, then the combination estimator 122 estimates that the user is puzzled about which kind of information he or she has to enter. That means the circumstances where a message prompting calling of the officer in charge is possibly be necessary.

The combination estimator 122 thus estimates the condition of the user by providing, as described above, stepwise estimates of conditions regarding the user's body and of the entry state. The estimator 122 can accomplish the stepwise estimates by using an identification method, such as a support vector machine (SVM) that is a two-class pattern identification device.

Note that the present invention may not be limitative to the estimation method specifically implemented by the combination estimator 122 described above. The estimator 122 can be adapted to use a combination of the results of decisions separately made from each other under preset conditions to estimate the condition of the user. More specifically, the estimator 122 has plural sets of conditions set up regarding the conditions of the body of the user and the entry states, and uses the person condition and entry state information transferred to make decisions as to whether or not the plural sets of conditions are met independently of each other. The estimator 122 uses in combination the results of the decisions made under the separate conditions to estimate the condition of the user.

Now, reference will be made to FIG. 3, which illustrates one example of estimation process performed by the entry assistance apparatus 100 in accordance with the embodiment. In the figure, an example of table is shown which is used by the entry assistance apparatus 100, more exactly the condition estimator section 104, to estimate the condition of the user. As shown, the exemplified condition of the user to be estimated by the condition estimator section 104 may include "a condition that the user has started to fill in a form", "a condition that the user is puzzled about which form to select", and "a condition that the user is puzzled about into which form field the user should make an entry". The conditions of the user estimated by the entry assistance apparatus 100 may not be restrictive to the examples shown in FIG. 3. For instance, the entry assistance apparatus 100 may assume various conditions including "a condition that the user is making an entry into the form" and "a condition that the entry into the form is erroneous".

Conditions 1, 2, 3 and so forth shown in FIG. 3 are what are estimated by the condition estimator section 104 based on person condition and entry state information. The combination estimator 122 included in the condition estimator section 104 uses the person condition or entry state information transferred from the detector section 102 to make a decision as to whether the conditions are met (true (T)) or not (false (F)) in FIG. 3. Thus, the estimator 122 determines, as an estimate, a condition corresponding to a combination of the results of the decisions as a condition of the user, which is depicted in the column "Estimated Condition" in FIG. 3.

The condition in which the user is puzzled about into which form field he or she should make an entry arises when the following four conditions (a) through (d) are satisfied: (a) the position of the user indicated by positional information is within a predetermined range in which he or she can write, (b) the posture indicated by postural information permits the user to write, (c) the entry position indicated by entry position information permits the user to make an entry, and (d) the entered content indicated by entered-content information keeps itself without varying in a predetermined period of time, e.g. several seconds.

The combination estimator 122 included in the condition estimator section 104 can reference data stored in the form of table as shown in FIG. 3 to use in combination the results of decisions made under separate conditions to thereby estimate the condition of the user.

The present invention may not be restrictive to the specific table thus used by the condition estimator section 104 as described above to estimate the condition or conditions of the user. The estimator section 104 can estimate the same condition of the user as his or her different condition by making the same condition of the user associated with a combination of different conditions. For example, when the entered content is erroneous, if the entry error does not exceed (or is below) a predetermined threshold value, then the estimator section 104 estimates the condition as a condition that a cautionary message should be presented. If the entry error exceeds (or not lower than) the threshold value, then the condition estimator section 104 presents a message for effecting that an officer in charge will be called. The estimator section 104 can thus assign the same condition of the user to a different condition identification according to a combination of conditions to thereby provide a different presentation under the same condition of the user.

In a case where the entry assistance apparatus 100 has a function of using the entered content of the user, such as name or account number, to acquire attribute information on the attributes of the user, such as age or sex, the condition estimator section 104 can treat a condition associated with a piece of attribute information as an estimation condition to thereby make the same condition of the user correspond to a combination of different conditions. Thus, the condition estimator section 104 can adjust a content to be presented and/or a way of presentation to the user according to an attribute, such as an age group to which the user belongs, even under the same condition of the user.

The condition estimator section 104 thus comprises the person condition estimator 118, entry state estimator 120 and combination estimator 122 to thereby perform the estimation process (2) described above. The present invention may not be limitative to such a specific structure of the condition estimator section 104 as to comprise the person condition estimator 118, entry state estimator 120 and combination estimator 122. The estimator section 104 can be configured to include any one or more of the person condition estimator 118, entry state estimator 120 and combination estimator 122 in compliance with the configuration of the detector section 102.

Referring again to FIG. 2, the exemplified configuration of the entry assistance apparatus 100 of the illustrative embodiment will continue to be described. The presentation information selector 106 serves as performing the presentation information selecting process (3). Specifically, the selector 106 is adapted for referencing the presentation information database 124 storing presentation information to decide, or select, presentation information corresponding to an estimated condition of the user.

FIG. 4 shows an exemplified format of table storing presentation information in the presentation information database 124. In the database 124, data are described in a language, such as XML (Extensible Markup Language), setting forth meanings and structures. The invention may not restrictive to the presentation information database 124 described in such a specific language as XML.

The column "Condition ID" in FIG. 4 is a field for storing identification information identifying a result of estimation provided by the condition estimator section 104. The presentation information selector 106 can use a condition identification (ID) 134 transferred from the condition estimator section 104 to search the presentation information database 124 to thereby identify presentation information appropriate for the result of estimation provided by the condition estimator section 104.

In FIG. 4, the column "Type of Presentation Information" is a field for storing the sort of a content of, or indicated by, presentation information, such as message or alert (cautionary message). The column "File Name" is a field for storing the name of a data file containing the content of presentation information. The file name may be exemplary. In addition thereto or in place thereof, a file path indicating a storage location at which the file is stored may be stored. Examples of messages to be presented may include "Welcome to the bank" or "Please make an entry here" at the start of servicing, and "Thank you very much" at the end of servicing. Alerting messages may be, for example, ones highlighting an erroneously filled-out blank when the entered content is in error, and calling a clerk in charge when the user is puzzled about what he or she has to enter.

The present invention may not be restricted to the contents of the messages indicated by presentation information described above. The entry assistance apparatus 100 can present examples of item of entry to be made by the user as well as advertisements as in the form of digital signage.

The column "Specified Display Section" in FIG. 4 is a field for storing location data designating the feature of a display section, such as area or shape, on a display screen 152, FIG. 1, of the display unit 126, described later, which will be used to display the content of presentation information. The column "Priority" in the figure is a field for storing an index indicating how important presentation information is, namely the degree of importance of presentation information. As described previously, the entry assistance apparatus 100 adjusts the order and/or content of presentation based on the priority set in presentation information. Use of the presentation information database 124 as shown in FIG. 4 permits the entry assistance apparatus 100 to employ a view management procedure based upon priorities to thereby provide the user with the content of presentation information.

The priorities may be set in advance as shown in FIG. 4. However, that may not be limitative. For example, the entry assistance apparatus 100 may be adapted for obtaining attribute information on the attribute of the user to adjust the priority based on the attribute information. For instance, when the age derived from attribute information reveals the user to fall in a senior age class, the entry assistance apparatus 100 may set higher the priority of presentation information whose content is that displayed characters are larger.

The presentation information selector 106 uses a condition identification 134 transferred from the condition estimator section 104 to reference the presentation information database 124 as shown in FIG. 4 to select one or more pieces of presentation information. In the invention, presentation information may not be restricted to what is specifically shown in FIG. 4. Presentation information may further include away of presentation and parametric information on presentation, such as the volume and direction of a sound source as described earlier.

The presentation information selector 106 may be adapted for managing the presentation of information to be presented by the information presenter 108. Specifically, the selector 106 may produce and transfer control signals for starting the presentation of the content of, or indicated by, presentation information, arranging the content or way of display, and stopping the presentation of the content to the information presenter 108, thereby managing the presentation of information to be presented by the information presenter 108.

Referring again to FIG. 2, in the exemplified configuration of the entry assistance apparatus 100, the information presenter 108 performs the presentation process (4) described earlier. More specifically, the information presenter 108 is adapted for being operative in response to a control signal 136 transferred from the presentation information selector 106 to present presentation information corresponding to that control signal, arrange the content of presentation, or stop the presentation. The information presenter 108 may include a storage, not shown, in which various data representing the content of presentation information are stored. When presentation information is presented, the information presenter 108 may appropriately read out information to be presented from the storage based on the control signal transferred. The presenter 108 processes, e.g. decodes, the presentation information thus read out for presentation.

In the illustrative embodiment shown in FIG. 2, the information presenter 108 includes the display unit 126 capable of visually presenting the content of information to be presented to the user. The display unit 126 may be a liquid crystal display (LCD) or an organic electroluminescence display. In the illustrative embodiment, the display unit 126 is implemented, as shown in FIG. 1, by a video projection system including the display screen 152 and projector 154 adapted to project images on the screen 152. In place of the video projection system, an electronic paper is applicable to the display unit 126. The display unit 126 may also be implemented into a touch screen that the user can manipulate to make manual entry.

The present invention may not be restrictive the specific configuration of the information presenter 108 shown in FIG. 2. The presenter 108 may include a DSP (Digital Signal Processor) and an audio output device configured to include an amplifier and loudspeakers. In such a configuration, the entry assistance apparatus 100 can provide an audible (auditory) presentation. The information presenter 108 may have devices for implementing various kinds of presentation information which resort to any of the human five senses, such as tactile presentation, e.g. vibration, temperature change or wind blow.

The configuration specifically shown in and described with reference to FIG. 2 allows the entry assistance apparatus 100 to perform the processing starting with the detection process (1) and ending with the presentation process (4), thus enhancing the convenience of the user, when making a handwritten entry.

The entry assistance apparatus 100 may not be restricted to the specific configuration shown in FIG. 2. The apparatus 100 may include a communication unit 202, FIG. 14 and described later on, adapted to communicate with an external device directly or over a telecommunications network.

Well, in a specific application, the entry assistance apparatus 100 will proceed to the entry assistance operation as will be described below. In operation, for example; the apparatus 100 may detect person condition information, entry state information and type-of-form information. Further in operation, the apparatus 100 may detect person condition information including both positional and postural information, as well as entry state information including both entry position and content information.

The operation will be described of the entry assistance apparatus 100 when exemplarily equipped with such infrared cameras 140 with reference to FIG. 5, a flowchart illustrating an example of sequence of operation performed by the apparatus 100.

First in step S100, the entry assistance apparatus 100 determines whether or not the user has been sensed. The apparatus 100 manages such determination as to whether the user has been detected by using a flag, for example.

More specifically, if it is determined that the pressure value sensed by the COG sensor 158 is in excess of a predetermined threshold value, then the entry assistance apparatus 100 determines that the user has been detected. The apparatus 100 in turn sets the flag ON to indicate that the user has been detected. This condition of the flag is maintained until it is determined that the user is no longer detected. If it is determined that the pressure value is no longer in excess of the predetermined threshold value, then the entry assistance apparatus 100 resets the flag to indicate that no user is detected. This condition of the flag is maintained until it is determined that the user is again detected.

When the user is standing in front of the entry assistance apparatus 100, i.e. on the COG sensor 158, the COG sensor 158 produces a pressure value exceeding the threshold value because of the weight of the user. The apparatus 100 is thus adapted to set in this condition the flag to indicate that the user has been detected.

The present invention may not be limitative to the specific method described above of sensing the user by the entry assistance apparatus 100 in the instant embodiment. The apparatus 100 can also sense the user using the range finder 156 functioning as the position detector 110. Specifically in that case, the apparatus 100 may be adapted to determine that the user has been detected provided that the distance value (an example of positional information) sensed by the range finder 156 becomes smaller than the predetermined threshold value and maintains itself for a predetermined period. Alternatively, plural imagers, not shown, serving as the position detector 110 may be arranged around the desktop surface 150 to capture an image therearound to compare the image with a reference image taken or prepared when no person appears around the apparatus 100 to thereby detect the user. More specifically, the entry assistance apparatus 100 may detect the user by applying a background subtraction or a skin color detection procedure to the reference image and the image currently taken.

If, in step S100, no user has been sensed, then the entry assistance apparatus 100 does not proceed until the presence of the user is detected.

In step S100, if it is determined that the user has been detected, the entry assistance apparatus 100 performs the processing subroutine S102 for detecting the position and posture of the user to produce positional and postural information.

An example of subroutine for detecting the position and posture of the user will be described. For example, an exemplified subroutine for detecting positional information will proceed in the following fashion. The entry assistance apparatus 100 uses the result of the detection made by the COG sensor 158 to detect the position of the user. In general, the number of points from which a pressure is sensed by the COG sensor 158 depends upon the shape of the shoes the user wears. It is, however, possible to set a threshold value for detection within a reasonable range of human weights to thereby estimate the shape of the user's feet from the position of a point exceeding (or not lower than) the threshold value. The entry assistance apparatus 100 may rely upon such a way of estimation to detect that the user is standing at the estimated position.

Figure 6:
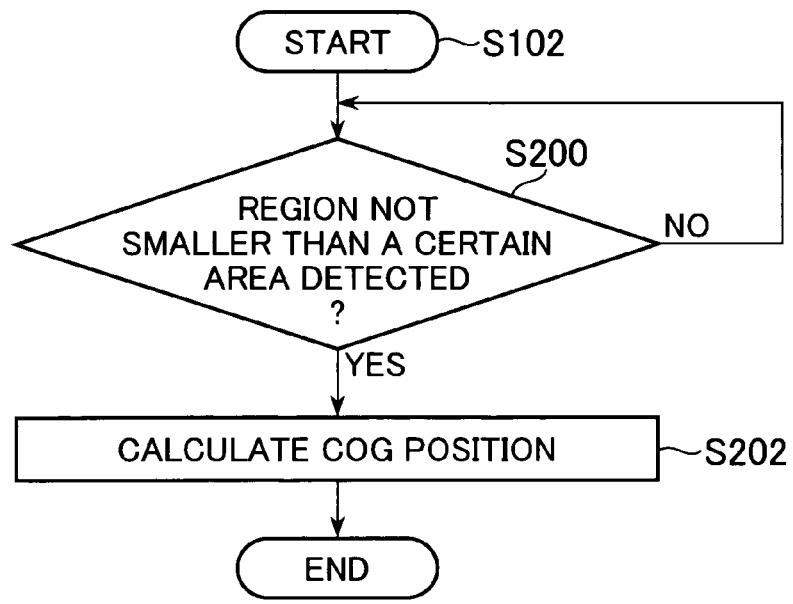
FIG. 6 is a flowchart of an example of sequence of operation of detecting positional information, performed in a subroutine of the sequence flow shown in FIG. 5.
Figure 7:
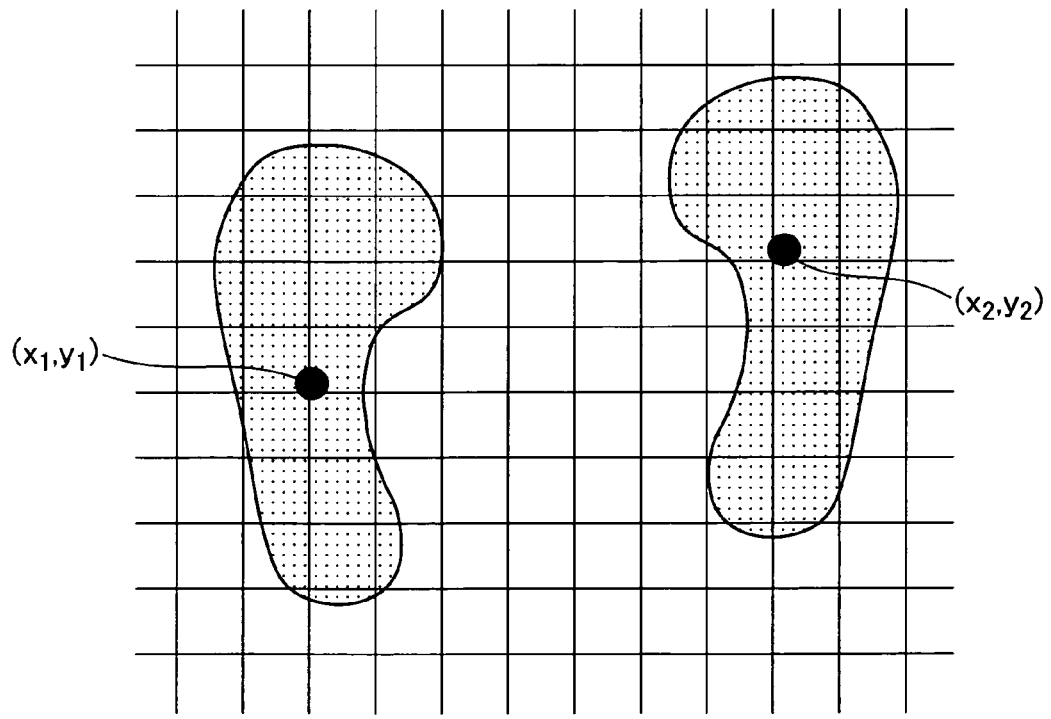
FIG. 7 explanatorily shows a coordinate system useful for understanding an example of sequence of operation to detect positional information in the entry assistance apparatus of the embodiment.

FIGS. 6 and 7 are useful for understanding one example of process performed by the entry assistance apparatus 100 in accordance with the embodiment to detect positional information. In this example illustrated in FIGS. 6 and 7, the entry assistance apparatus 100 detects the position of the user based on the result of detection made by the COG sensor 158.

In step S200, the entry assistance apparatus 100 makes a determination as to whether or not a region is detected in which the COG sensor 158 has sensed a pressure value in excess of the threshold value and which has an area equal to or broader than a predetermined value. Unless it is determined in step S200 that such a region is detected, the apparatus 100 does not proceed to further control until it determines such a region detected.

If it is determined in step S200 that pressure values exceeding the threshold value have been detected in a region equal to or broader in area than the predetermined value, then the entry assistance apparatus 100 calculates the position of the center of gravity of this region (S202). The apparatus 100 detects the calculated position of the center of gravity as the position of the user. FIG. 7 shows an example of position of the center of gravity computed by the assist apparatus 100. The apparatus 100 is adapted to represent the position of the center of gravity on a coordinate system whose origin lies at a predetermined position on the COG sensor 158.

The entry assistance apparatus 100 thus follows the processing steps illustrated in FIG. 6 to thereby detect the position of the user to produce positional information, which is coordinate data representing the position of the center of gravity.

In the present invention, the specific processing in the entry assistance apparatus 100 for detecting the position described above may not be restrictive. The apparatus 100 may be adapted to use a distance value detected by the range finder 156 to correct the position of the center of gravity. The apparatus 100 may use the distance value detected by the range finder 156 as positional information.

An example of procedure of detecting postural information will be described. When positional information is detected, the entry assistance apparatus 100 uses the COG sensor 158 to detect postural information. Specifically, the apparatus 100 uses the distribution of pressure values detected around the detected position to calculate therefrom the position of the center of gravity of the body of the user and the variance of the distribution of pressures to take the calculated values as postural information.

Figure 8:
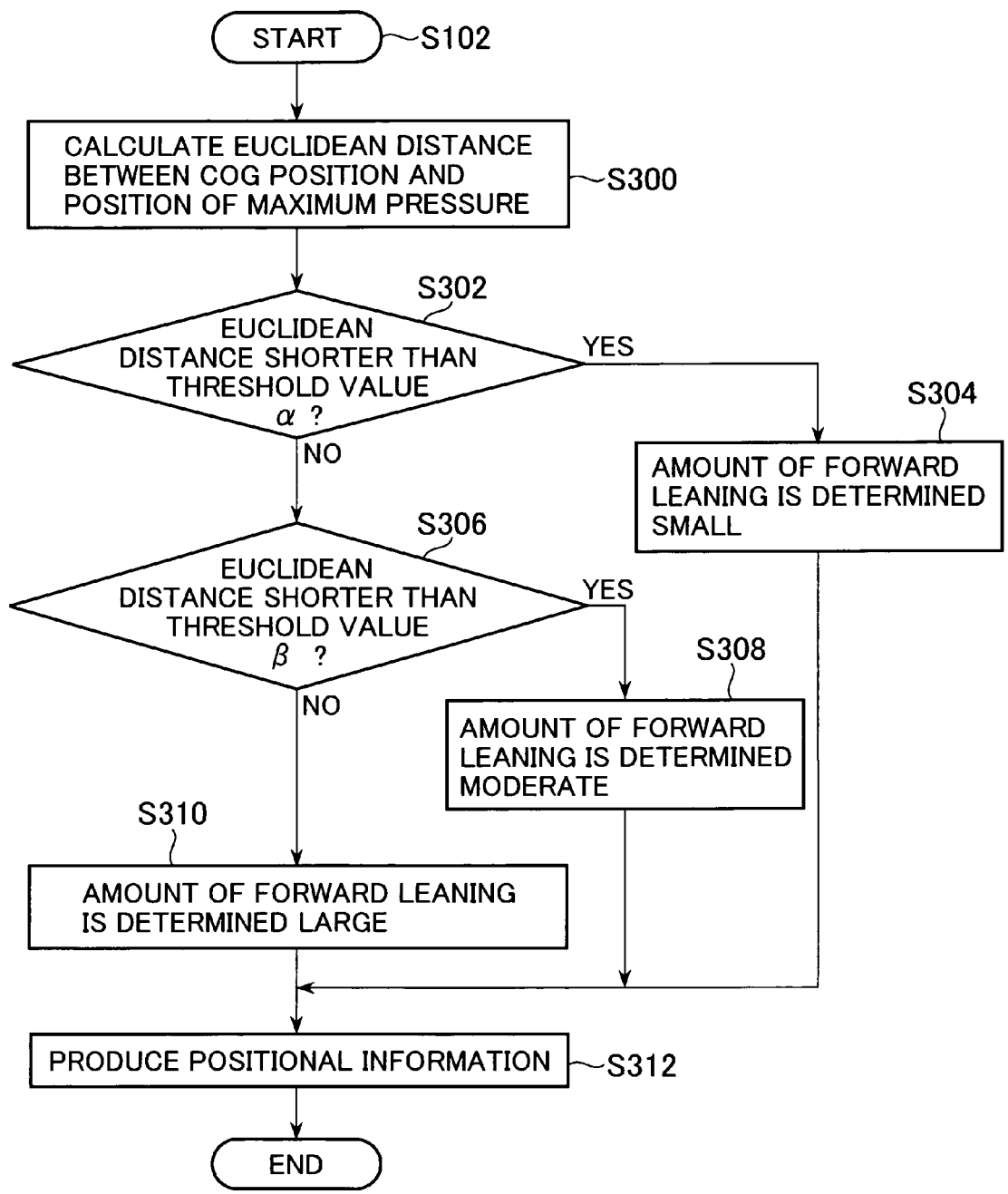
FIG. 8 is, like FIG. 6, a flowchart useful for understanding an example of sequence of operation of detecting postural information, performed in the subroutine of the sequence flow shown in FIG. 5.
Figure 9:
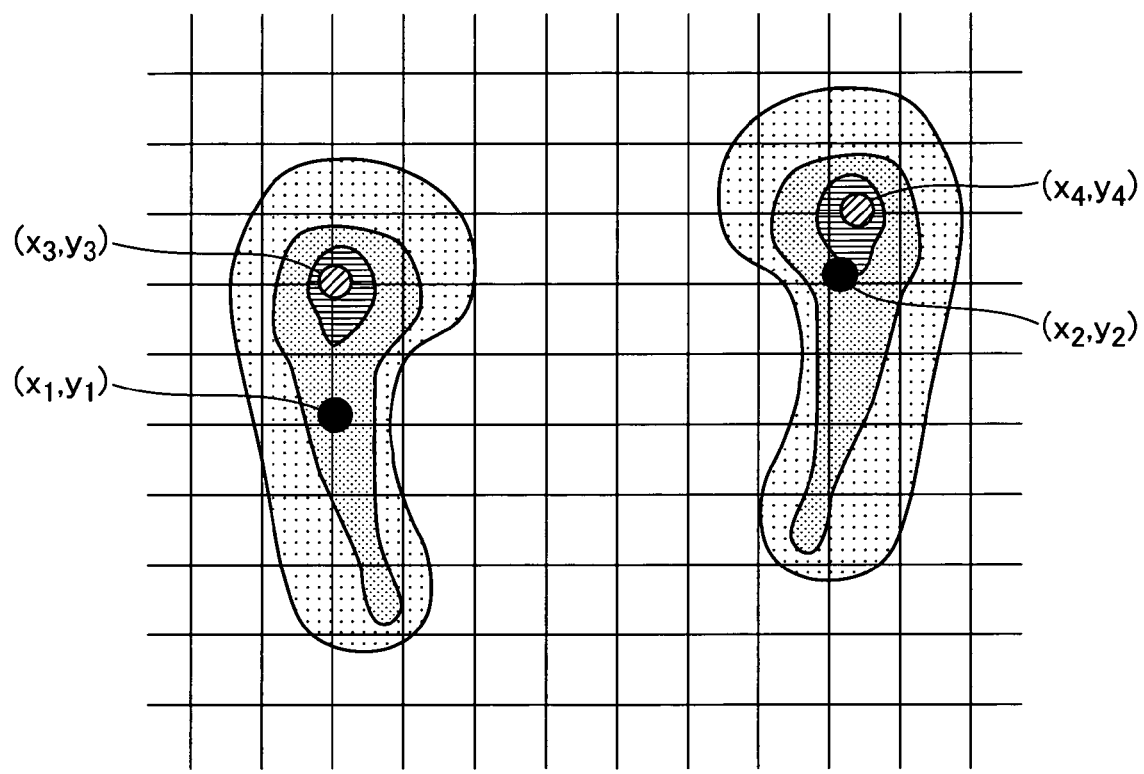
FIG. 9 explanatorily shows, like FIG. 7, a coordinate system useful for understanding an example of sequence of operation to detect postural information in the entry assistance apparatus of the embodiment.

FIGS. 8 and 9 are useful for understanding an example of sequence of operation performed by the entry assistance apparatus 100 to detect postural information. In this example, the apparatus 100 uses the result of detection made by the COG sensor 158 to detect the posture of the user. In FIG. 9, coordinates $(x_1, y_1)$ and $(x_2, y_2)$ indicate the positions of centers of gravity. Coordinates $(x_3, y_3)$ and $(x_4, y_4)$ indicate the position at which the pressure is maximal, the position being sometimes referred to as the maximum-pressure position.

Now, in FIG. 9, in step S300, the entry assistance apparatus 100 computes the Euclidean distance between the position of the center of gravity and the maximum-pressure position.

If the Euclidean distance is computed in step S300, the entry assistance apparatus 100 makes a decision as to whether the Euclidean distance is equal to or higher than a threshold value α (S302), which is a first threshold value to determine the degree of forward leaning of the user, from which it is determined whether or not the amount of forward leaning is small.

Then in step S302, unless it is determined that the Euclidean distance is equal to or higher than the threshold value α, then the entry assistance apparatus 100 proceeds to step S304 to determine that the amount of forward leaning is small. The apparatus 100 in turn produces postural information appropriate for the result of the decision (S312), and the processing will be terminated.

If it is determined in step S302 that the Euclidean distance is equal to or higher than the threshold value α, then the entry assistance apparatus 100 makes a decision in step S306 as to whether or not the Euclidean distance is equal to or higher than a threshold value β, which is a second threshold value to determine how much the user leans forward, where the second threshold value is higher than the first threshold value. It is thus determined whether or not the amount of forward leaning is moderate.

In step S306, unless it is determined that the Euclidean distance is equal to or higher than the threshold value β, then the entry assistance apparatus 100 determines in step S308 that the amount of forward leaning is moderate. The apparatus 100 in turn produces postural information appropriate for the result of the decision (S312), and then the processing is terminated.

If it is determined in step S302 that the Euclidean distance is equal to or higher than the threshold value β, then the entry assistance apparatus 100 determines that the amount of forward leaning is great (S310). The apparatus 100 then produces postural information appropriate for the result of the decision (S312) and terminates the processing.

The entry assistance apparatus 100 thus proceeds to the processing subroutine illustrated in FIG. 8 to thereby make a decision concerning how much the user is tilted toward the apparatus 100, i.e. toward the desktop surface 150. Values of the amount of forward leaning are clustered. The apparatus 100 produces postural information on the result of the clustering, for example, in the form of data indicating the degree of the forward leaning.

The specific detection process performed by the entry assistance apparatus 100 to detect postural information as described above may not be restrictive. The apparatus 100 can also be adapted to use the range finder 156 functioning as the posture detector 112 to sense the position of the head of the user with respect to a reference position on the desktop surface 150 to thereby detect the posture of the user from the position of the head. More specifically, the entry assistance apparatus 100 holds data of the detected position of the head, and calculates the moving speed of the head position from time-serial data about the head position to thereby detect postural information carrying values indicative of how much the user leans forward and how much his or her head is tilted when he or she is in the standing posture.

Now, reference will be made to FIG. 10, which shows a table useful for understanding another example of detection process for detecting postural information by the entry assistance apparatus 100 in accordance with the illustrative embodiment. The example illustrated in FIG. 10 is directed to the entry assistance apparatus 100 adapted to use the results of detection done by the range finder 156 to detect the posture of the user.

In the example, the entry assistance apparatus 100 is adapted for producing postural information according to combinations of various items shown in the table of FIG. 10. Specifically, the entry assistance apparatus 100 uses distance values detected by the range finder 156 to establish a human body model of the upper half of the body of the user. The apparatus 100 selects one of the human body models made correlative in advance to distance values which is associated with a distance value detected by the range finder 156 to thereby establish a human body model. The apparatus 100 then calculates a position that can be estimated as the position of the head on the established human body model. Then, the apparatus 100 traces the calculated head position, while shifting as the user moves, to estimate how the user has moved his or her the head position to thereby estimate the degree of forward leaning through the threshold processing subroutine illustrated in and described with reference to FIG. 8.

The present invention may not be restrictive to the above-described procedure of estimating the movement of the head position by tracing variation of the position that can be estimated as the head. For example, the entry assistance apparatus 100 may be adapted to sense variation in position of the whole upper half of the body to thereby indirectly estimate the position of the head of the user.

In FIG. 10, the moving speed of the head is represented with respect to any one or all of the X-, Y-, and Z-axes on the coordinates. Where the entry assistance apparatus 100 is designed to sense only forward leaning of the user, the apparatus 100 may calculate the moving speed on the axis substantially perpendicular to the apparatus from the head position. Where the apparatus 100 is adapted to sense the posture of the user in his or her left-and-right direction, the apparatus 100 may compute the moving speed on the axis substantially parallel to the apparatus from the head position. From the moving speed thus calculated, the apparatus 100 estimates how the moving speed is, i.e. the degree of moving speed, through the threshold processing subroutine illustrated in FIG. 8.

The acceleration in movement of the head shown in FIG. 10 may be computed from the moving speed of the head. From the acceleration in movement of the head thus calculated, the entry assistance apparatus 100 may estimate how the acceleration is, i.e. the degree of the acceleration in movement of the head, through the threshold processing subroutine shown in FIG. 8.

The droopy posture of the user can be represented by the position, moving speed and acceleration in movement of the head. However, the entry assistance apparatus 100 can represent how the head is tilted as shown in FIG. 10. The apparatus 100 may form the values of the position, moving speed and acceleration in movement of the head in the postural information. If the human body model differs in tallness from the user to be detected, the apparatus 100 can enlarge or reduce the human body model of the upper half portion so as to more accurately calculate the values of the position, moving speed and acceleration in movement of the head. The degree of the tallness of the user to be detected can be estimated by sensing his or her eyes from images taken by the imagers, not shown, arranged around the desktop surface 150. That specific method of estimating the user's tallness may not be restrictive.

The entry assistance apparatus 100 thus performs the processing described above to detect positional and postural information as person condition information. The present invention may not be restrictive to the processing for detecting the position and posture described above.

Referring back to FIG. 5, the example of processing performed by the entry assistance apparatus 100 will continue to be described. When the subroutine S102 for detecting the position and posture has been carried out, the entry assistance apparatus 100 proceeds to step S104 in which the apparatus 100 utilizes the detected person condition information to select information to be presented according to the condition of the person. The apparatus 100 selects presentation information through the estimation process, or subroutine, (2) and the process (3) for selecting presentation information as described above.

The entry assistance apparatus 100 then uses the selected presentation information so as to present the content of, or indicated by, the information thus selected to the user through the presentation process (4) described above. Whenever presentation information is selected as described above, the apparatus 100 performs the presentation process. However, that specific way of processing may not be limitative. The apparatus 100 may present the content of selected presentation information after the processing described with reference to FIG. 5 is completed. In addition, the content of presentation information thus selected may periodically be presented, rather than once.

Figure 11:
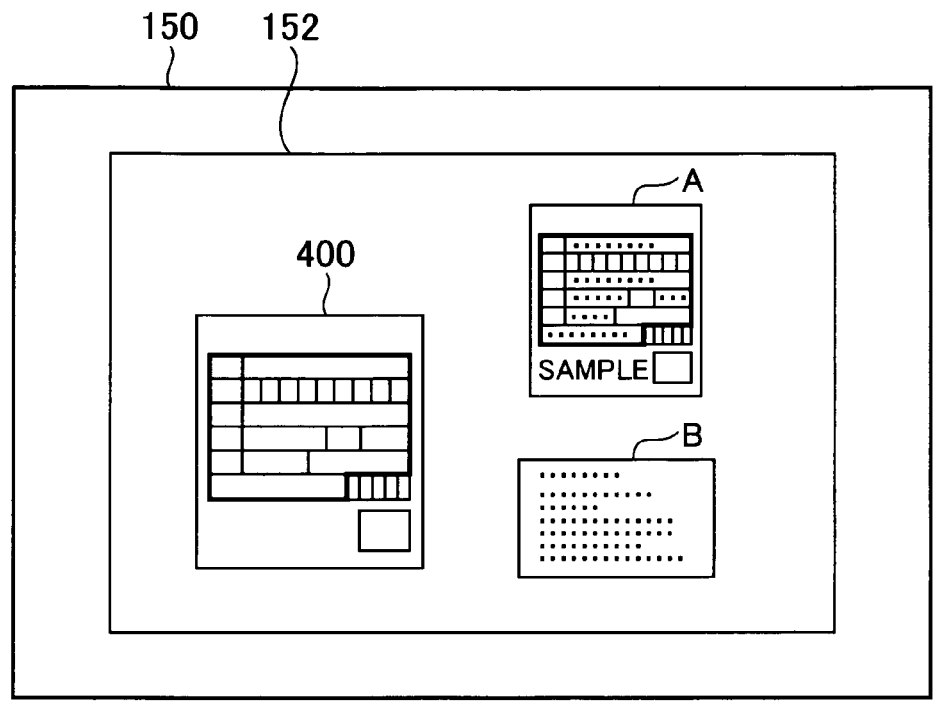
FIGS. 11 and 12 are explanatory plan views showing examples of presentation provided by the entry assistance apparatus in accordance with the embodiment.
Figure 12:
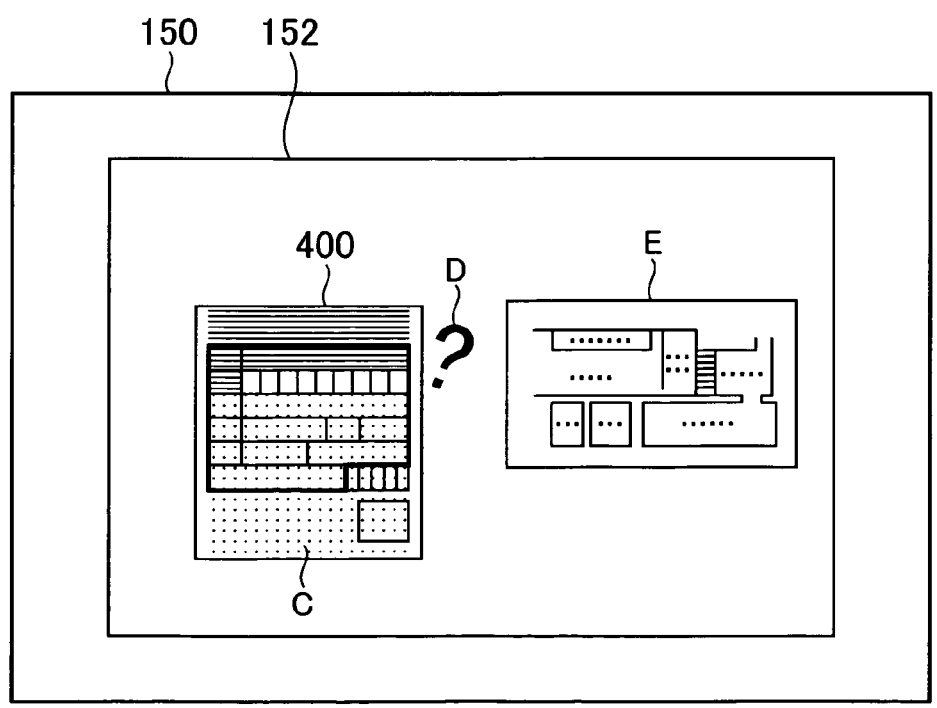

Examples of presentation will be described with reference to FIGS. 11 and 12, which illustrate in plan views examples of presentation provided by the entry assistance apparatus 100. FIG. 11 shows an example of content of presentation information which is visually offered to the user when it is estimated that he or she is currently making an entry. FIG. 12 shows an example of presentation information which is also visually offered to the user when it is estimated that he or she has finished entry.

As seen from FIG. 11, when it is estimated that the user is currently making an entry, the entry assistance apparatus 100 presents, i.e. displays, the contents A and B of presentation information on the display screen of the desktop 150 around the paper form sheet 400. The presentation A provides an example of entry, or sample, on a paper form corresponding to the paper form sheet 400. The presentation B provides notes to be observed when an entry is made.

One example of the case where it is estimated that the user is currently making an entry may be when the position indicated by detected positional information is located within a predetermined range set on the COG sensor 158 and the position estimated as the head of the user based on the range finder 156 lies on the desktop surface 150. The predetermined range on the COG sensor 158 may be, for example, the half of the sensing region of the COG sensor 158 closer in FIG. 1 to the entry assistance apparatus 100. The method to estimate that the user is currently making an entry may not specifically be restricted to what is implemented by the apparatus 100 as described above. The apparatus 100 can enhance the estimation accuracy by combining pieces of information about written characters that are discriminated using stroke information obtained from the motion of the input tool 300, as disclosed by, for example, Mori cited earlier.

When it is estimated that the user has finished making an entry and the entered content is in error, the entry assistance apparatus 100 highlights, as shown in FIG. 12, the erroneous portion C of the entered content on the paper form sheet 400 and issues an alerting message as in the form of mark "?". If it is estimated that the user has complete the entry, the entry assistance apparatus 100 presents a way E such as to inform the user where he or she should submit the entry sheet 400 thus he or she has put on record.

It may be estimated that the user has finished making an entry when, for example, the position indicated by the detected positional information is located within a predetermined range on the COG sensor 158 and the position estimated as the head of the user based on data derived from the range finder 156 is not on the desktop surface 150 or spaced more than a predetermined distance from the desktop surface 150. The predetermined range on the COG sensor 158 may be, for example, the central region on the COG sensor 158 shown in FIG. 1. The entry assistance apparatus 100 may be arranged to estimate, when an action, such as a stretch, of the user is detected from the result of detection of the position estimated as the head of the user, that the user has completed the entry. It may be estimated that the entered content is in error when, for example, stroke information obtained from the motion of the input tool 300 indicates a marking-out action and an action of drawing an erasure line. The apparatus 100 can enhance the estimation accuracy by combining various pieces of information about the motions.

The entry assistance apparatus 100 thus uses the detected position and posture and time-serial variations in position and posture of the user to estimate the condition of the user, and presents presentation information appropriate for the result of estimation to the user, as shown in FIGS. 11 and 12, such as alert and presentation of examples or templates of entry items necessary to make a handwritten entry that is recognized on a real-time basis. Visual representation that may be provided by the entry assistance apparatus 100 may not be restricted to the examples shown in FIGS. 11 and 12.

Referring again to FIG. 5, the entry assistance apparatus 100 will further continue the exemplified processing. When step S104 is performed, the apparatus 100 advances to the step S106 of making a decision as to whether or not the type of paper has been identified. If type-of-form information has been detected from the paper form sheet and the type of the paper form sheet or paper medium indicated by the detected type-of-form information can be identified, then the apparatus 100 concludes that the type of the paper form sheet is determined. The apparatus 100 images a barcode (an example of type-of-form information) printed on the rear surface of the paper form sheet 400 by means of the video pickup device 160, and identifies the type by means of the processor, not specifically shown. In turn, the apparatus 100 uses the type-of-form information and consults with a table in which the type of the paper form sheet (paper medium), positions of items to be filled in, contents and so on are interrelatedly stored to paper medium information, and identifies a paper form sheet corresponding to the detected type-of-form information. The invention may not be restrictive to that specific procedure performed by the apparatus 100 as described in step S106.

Figure 5:
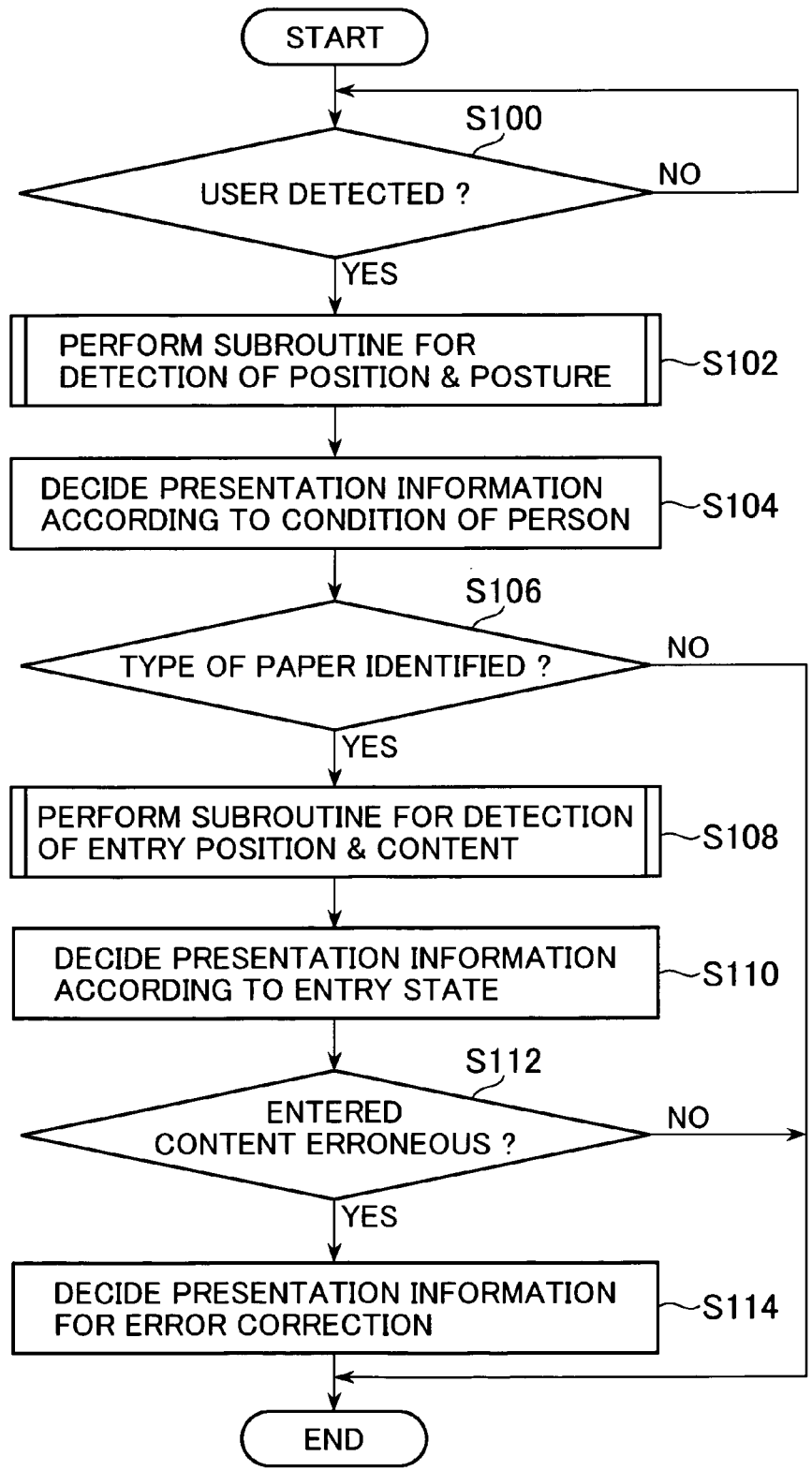
FIG. 5 is a general control flowchart useful for understanding an exemplified sequence of operation performed by the entry assistance apparatus of the illustrative embodiment.

In step S106, unless it is determined that the type of the paper form sheet has been identified, the entry assistance apparatus 100 terminates the processing routine illustrated in FIG. 5. The routine shown in FIG. 5 may not be one-time processing but repetitively performed.

If, in step S106, it is determined that the type of the paper form sheet has been identified, the entry assistance apparatus 100 performs the subroutine S108 for detecting the entry position and content to detect entry positional and content information.

An example of subroutine for detecting the entry position and content will be described with reference to FIG. 13, which illustrates in a control flowchart an example of subroutine the entry assistance apparatus 100 performs to detect the entry position and content of an entry.

The entry assistance apparatus 100 measures an entry position (S400) and an entered content (S402), and detects an entry position and an entered content based on the results from the measurements (S404). The apparatus 100 may perform the the method disclosed in, for example, in the above-cited Mori to thereby detect in real time the entry position on the paper form sheet 400 and recognizes the entered characters.

Figure 13:
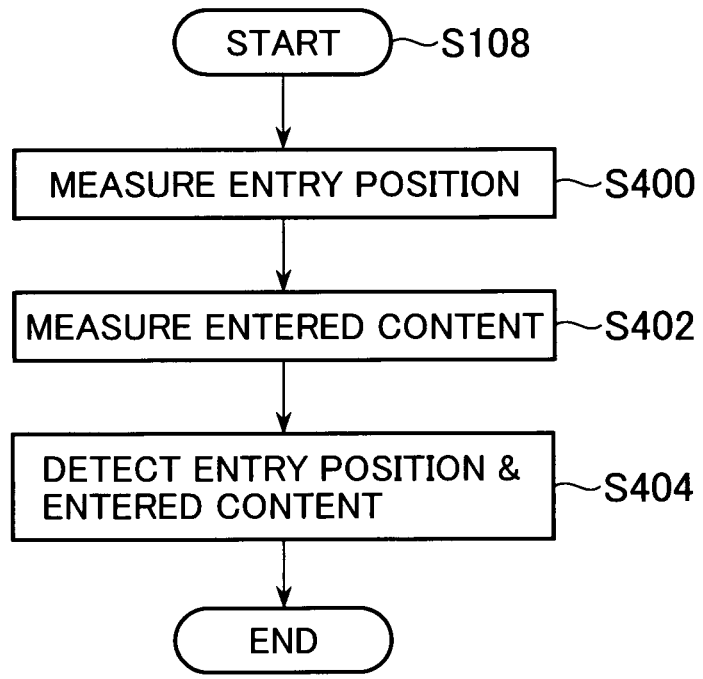
FIG. 13 is, like FIG. 6, a flowchart useful for understanding an example of process of detecting an entered position and content, performed in another subroutine of the sequence flow shown in FIG. 5.

The entry assistance apparatus 100 thus executes the processing subroutine illustrated in FIG. 13 to thereby detect the entry position and the entered content to detect entry position and content information as entry state information. The invention may not be limited to the method of detecting an entry position and an entered content by the apparatus 100 specifically described above.

Referring again to FIG. 5, the example of processing performed by the entry assistance apparatus 100 will further be followed. When the subroutine S108 for detecting entry position and entered content is completed, the entry assistance apparatus 100 proceeds to step S110, in which, based upon the detected entry state information, the apparatus 100 decides, i.e. selects, presentation information to be presented according to the entry state. In this step, the apparatus 100 performs the estimation process (2) and the process (3) for selecting presentation information to thereby select presentation information. The apparatus 100 is responsive to the presentation information thus selected to present the content of, or indicated by, the information to be presented to the user (presentation process (4) described earlier).

Following step S110 thus completed, the entry assistance apparatus 100 makes a decision as to whether or not the entered content is erroneous (S112). In the illustrative embodiment, the apparatus 100 uses stroke information obtained from the motion of the input tool 300 to perform the estimation step S112 in order to make such a decision. Note that the invention may not be restrictive to the specific way of estimation, as described above, performed by the apparatus 100 in step S112.

In step S112, if it is determined that the entered content is not erroneous, the entry assistance apparatus 100 terminates the processing.

In step S112, if it is determined that the entered content is erroneous, then the entry assistance apparatus 100 selects information to be presented for error correction (S114), and presents the content of, or indicated by, the information to be presented to the user (presentation process (4) described earlier). The entry assistance apparatus 100 performs the processing routine illustrated in FIG. 5 to estimate the condition of the user who makes a handwritten entry, and presents the information content corresponding to the result of the estimation to the user in an appropriate method.

More specifically, the entry assistance apparatus 100 relies upon information on the position and posture of the user and information on time-serial variation in position and posture to present to the user the content of the presentation information complying with purposes, such as alert, and exemplary presentation of written items necessary for handwritten entry of characters recognized in real time. Furthermore, the apparatus 100 estimates the condition of the user according to variations in environment surrounding the apparatus 100, such as variations in position and posture of the user, and presents to the user the content of the presentation information appropriate for the result of the estimation. That means that the apparatus 100 is not adapted to let the user control information to be presented but rather to automatically display necessary information onto intended locations, hinder information to be concealed from being presented, and appropriately switch the method of presentation. Accordingly, the entry assistance apparatus 100 can appropriately assist the user in making handwritten entry without changing the conventional way of handwritten entry.

Thus, the entry assistance apparatus 100 can enhance the convenience of the user through the processing routine shown in FIG. 5 when the user makes a handwritten entry. The way of processing performed by the apparatus 100 may not be restricted to what is shown in and described with reference to FIG. 5.

The entry assistance apparatus 100 in accordance with the illustrative embodiment shown in and described with reference to FIGS. 1 through 13 can thus improve the convenience of the user when making a handwritten entry. However, the present invention is not restricted to the specific configuration of the apparatus 100 in accordance with the embodiment shown in and described with reference to FIG. 2. Now, with reference to FIG. 14, an entry assistance apparatus, generally 200, in accordance with an alternative embodiment will be described.

Figure 14:
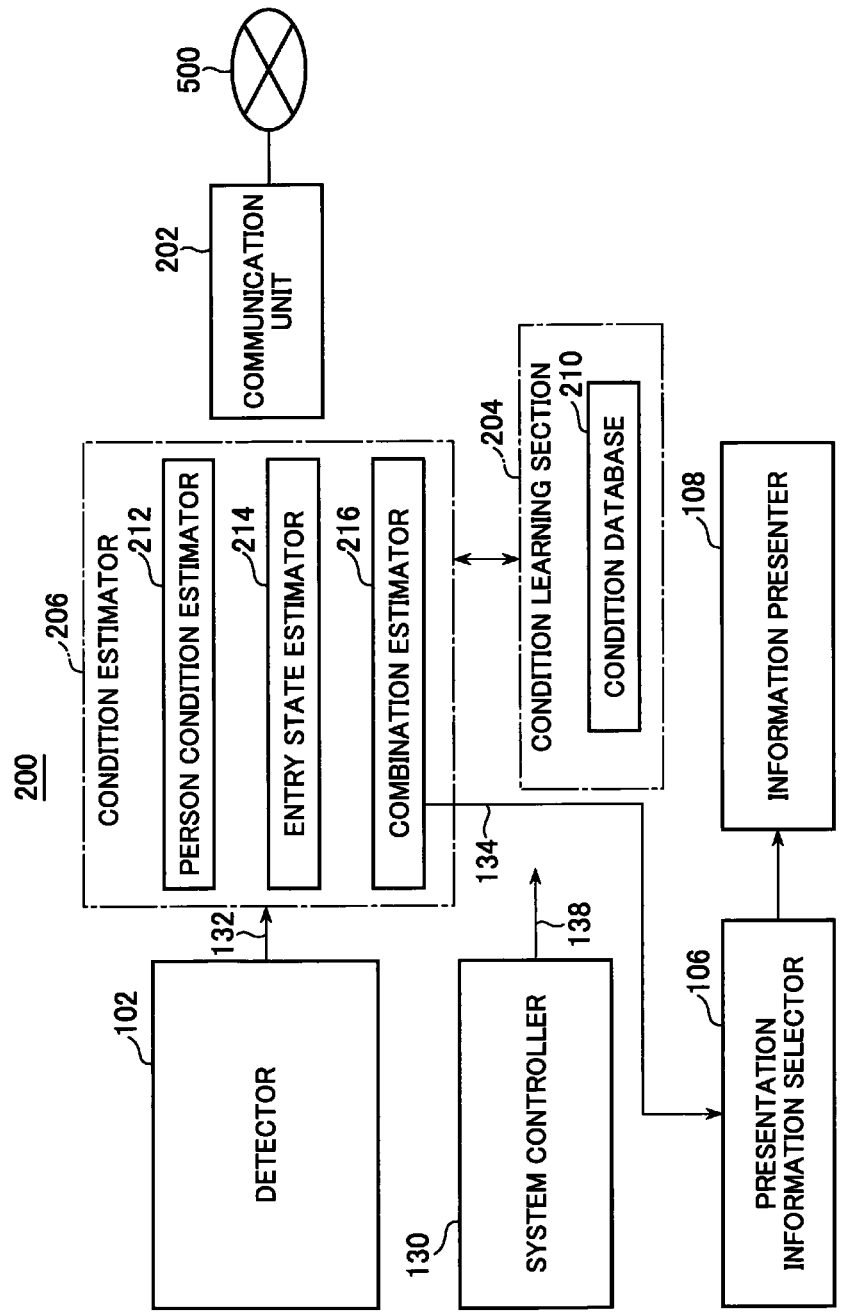
FIG. 14 is a schematic block diagram, like FIG. 2, showing one example of configuration of an entry assistance apparatus in accordance with an alternative embodiment of the present invention.

FIG. 14 is a schematic block diagram showing such an alternative configuration of the entry assistance apparatus 200. In the alternative embodiment, a telecommunications network 500 is also included as shown in FIG. 14. The telecommunications network 500 may be a wired network or a wireless network connected to wireless base stations. Those networks may be, for example, the Internet, or a LAN (Local Area Network) or a WAN (Wide Area Network), which use communication protocols, such as TCP/IP (Transmission Control Protocol/Internet Protocol).

Referring to FIG. 14, the entry assistance apparatus 200 may fundamentally be similar in configuration to the entry assistance apparatus 100 except that the apparatus 200 of the alternative embodiment additionally may include a communication unit 202 and a condition learning section 204 which are interconnected as depicted, and that the apparatus 200 includes, in place of the condition estimator section 104 shown in FIG. 2, a condition estimator section 206 which is different in function from the condition estimator section 104. Like components may be designated with the same reference numerals, on which repetitive description will be avoided.

The entry assistance apparatus 200 is adapted to allow the condition estimator section 206 to use candidates of estimation result on user conditions, i.e. condition IDs, stored in a condition database 210 managed by the condition learning section 204 to estimate the condition of the user. The condition database 210 stores condition data including detected pieces of information, such as person condition information and/or entry state information, and candidates of estimation result on user conditions interrelatedly with each other. Each of the condition data forms a record of the condition database 210.

The entry assistance apparatus 200 is adapted for causing the condition estimator section 206, when having performed estimation, to transfer the results of estimation on the user condition to the condition learning section 204 so as for the latter to update the condition database 210, i.e. register, update or delete condition data.

The entry assistance apparatus 200 can thus update the condition database 210 so as to learn the estimated condition of the user. Furthermore, the device 200 also uses candidates of estimation result on the condition of the user so as to estimate the condition of the user. The entry assistance apparatus 200 can thereby further improve the estimation accuracy than the entry assistance apparatus 100.

The entry assistance apparatus 200 comprises the communication unit 202, and is thus responsive to a request, when received by the communication unit 202 from an external device, so as to update the condition database. In the following description, such a request transmitted from an external device may be referred to as "update request", which may contain, exemplarily but not limitative to, control instructions for the condition database as well as status or condition data. Update requests may be ones an external device may autonomically transmit to the apparatus 200. Alternatively, the entry assistance apparatus 200 may periodically or nonperiodically request an external device to send an update request and, in response, the external device transmits an update request to the apparatus 200.

Depending on the attributes of the user, and/or an application or location where the entry assistance apparatus 200 is used, the apparatus 200 may need to be calibrated on estimation in advance to putting the apparatus 200 into operational use. Even in such cases, when plural entry assistance apparatus 200 are rendered operable in an enterprise or public organization, those apparatus 200 may be interconnected to the network 500, and one of those assist apparatus 200 newly installed may receive from another entry assistance apparatus the contents of samples of obtained data including the results of estimation provided by the other entry assistance apparatus so as to learn the contents of the samples, thereby being able to reduce the cost of calibrating the apparatus 200.

As described above, the entry assistance apparatus 200 has the learning function, and thus the accuracy in estimating the condition of the user may further be improved. The apparatus 200 has the function of communicating with an external device, e.g. another entry assistance apparatus 200, over the network 500 and using data associated with estimate results obtained from an external device for learning, whereby the accuracy in estimating the condition of the user can further be improved. In addition, the calibration costs can further be alleviated.

Now, the configuration of the entry assistance apparatus 200 will be described in detail. The communication unit 202 is communication means included in the entry assistance apparatus 200 to communicate with an external device, such as another entry assistance apparatus 200 wirelessly or over cable directly or over the network 500. The communication unit 202 may include a combination of a communication antenna and RF (Radio-Frequency) circuitry, or a LAN terminal, and a transmitter/receiver. The invention may not be restrictive to that specific configuration of the communication unit 202 described above. The communication unit 202 can be appropriately configured so as to be communicable with an external device over the network 500.

The condition learning section 204 is adapted to manage the condition database 210 and may play a leading role in performing processing associated with learning the entry assistance apparatus 200 does. The learning section 204 is fabricated by, for example, an MPU or an integrated circuit for implementing various functions. The MPU or integrated circuit may also play the role of the condition estimator section 206 and/or presentation information selector 106.

Specifically, when an inquiry is made from the condition estimator section 206, the condition learning section 204 is responsive to detection information contained in the inquiry to search the condition database 210 and send back a response consisting of a candidate of estimation result on the user to the condition estimator section 206. The condition learning section 204 successively transfers one or more condition identifications in the descending order of probability in expressing the condition of the user in response to the inquiry to the condition estimator section 206.

The present invention may not be limited to the above-exemplified response to be transferred to the condition estimator section 206 by the condition learning section 204. In an application where the condition database 210 further includes additional information, such as user attributes and/or time of day, as condition data, the condition learning section 204 may be adapted to transfer, in response to the inquiry, data with which the additional information is linked to the condition estimator section 206 in addition to condition identifications.

FIG. 15 shows in a table an example of data stored in the condition database 210 in which condition identifications indicating the conditions of the user and additional information are stored interrelatedly to each other. Examples of attribute information may include age groups, sexes, time of day and so on, which may not be restrictive. The entry assistance apparatus 200 can use attribute information complying with an application.

In addition to the condition database 210 containing condition data in which detection information and condition identifications, i.e. candidates of estimation result on the user's condition, are stored interrelatedly with each other, the entry assistance apparatus 200 may comprise a condition database in which condition identifications and additional information described above may be stored interrelatedly with each other. Databases applicable to the entry assistance apparatus 200 may not be restricted to the specific condition database containing condition data as described above in which detection information and condition identifications are interrelatedly stored and the specific condition database in which condition identifications and additional information are interrelatedly stored. The apparatus 200 can also use a condition database containing condition data in which detection information, condition identifications and additional information are stored interrelatedly with each other.

The condition learning section 204 uses the condition databases as described above to makes such a decision that those data items adopted more frequently represent the condition of the user with higher probability to transfer a response complying with the result of that decision to the condition estimator section 206. Consequently, the entry assistance apparatus 200 can improve the efficiency in estimating the condition of the user.

When an estimation result is transferred from the condition estimator section 206 or an update request is received from an external device via the communication unit 202, the condition learning section 204 updates the condition database, whereby the entry assistance apparatus 200 can perform more appropriate learning.

The significance that the entry assistance apparatus 200 performs learning by updating the condition databases based on an update request sent from another entry assistance apparatus 200, i.e. external device, will now be described. For example, in a certain time of day, if there is an entry assistance apparatus 200, called a first apparatus for convenience, which the users falling in a senior age group more often operate, it is estimated that a similar tendency may occur with another entry assistance apparatus 200 installed at the same site as the first apparatus 200, the latter being referred to as a second apparatus. The similar tendency may be directed to a phenomenon that plural apparatus 200 of the same kind installed at one and the same site where services may be offered are highly likely to be used by the users who expect similar services in a similar time of day. Under such circumstances, when the plural entry assistance apparatus 200 can share with each other detection information and condition identifications as well as condition information with which additional information, such as user attributes and time of day, is interrelated, the estimation accuracy may further be enhanced.

FIG. 14 shows an example in which the entry assistance apparatus 200 includes the condition database 210. The invention may not be restricted to this example. For instance, the entry assistance apparatus 200 does not include such a condition database, but alternatively the condition learning section 204 may be adapted to use a condition databases provided in an external device, e.g. server, to perform processing accordingly. In that case, a server with which plural entry assistance apparatus 200 can communicate is provided to include a condition database which may be updated based on the results of estimation provided by such plural assist apparatus 200, thereby further improving the accuracy in each entry assistance apparatus 200 estimating.

One example of method implemented by the entry assistance apparatus 200 to acquire attribute information on the attributes of the user may include acquiring such information based on information on an entry content. More specifically, the entry assistance apparatus 200 can be designed to acquire the content of entry the user made in a name field on a paper form 400, FIG. 1, to obtain "user's name" as attribute information. In an application where the user makes a handwritten entry on a paper form sheet offered from a financial organization, the entry assistance apparatus 200 may be adapted for using the detected account number of the user to consult with an external device, such as a server, to acquire information on the user, such as age group, sex and kind of business, so as to deal with the acquired information of the user as his or her attribute information.

The entry assistance apparatus 200 interrelates the acquired attribute information to condition identifications, which are results of estimation on the conditions of the user, and registers the information in the condition database. For example, if a time of day is registered as additional information, the apparatus 200 performs the following processing. The apparatus 200 stores the time at or during which the apparatus 200 was used, e.g. the time at which the apparatus 200 was started in use or for which an estimation was performed, and fits the stored time to times of day categorized in advance as spaced at, for example, two-hour intervals to identify the time of day. The apparatus 200 then interrelates information on the time of day with condition identifications, and stores them in the condition database 210. Alternatively, the apparatus 200 may interrelate the attribute information, information on the identified time of day and condition identifications with each other, and register them in the condition database 210.

The entry assistance apparatus 200 thus can use the detection information and the additional information, such as acquired attributes of the user and time of day, to search the condition database 210 having the condition data correlatively including detection information, condition identifications and additional information stored to thereby perform estimation with the candidates of estimation result narrowed in advance down to some conditions. That makes the apparatus 200 to further improve its estimation speed. When the entry assistance apparatus 200 is newly installed prior to being placed into practice or has not yet sufficiently learned, the calibration can be simplified with the estimation accuracy enhanced.

When using a condition database including plural tables respectively prepared for different times of day, the first entry assistance apparatus 200, referred to in the example stated above, may search a reduced amount of records with a time of day used as a condition. Specifically, the first entry assistance apparatus 200 identifies the current time of day and refers to such a table in the condition database which is appropriate for the identified time of day. Thus, the first entry assistance apparatus 200 can reference such a smaller amount of records than a case where the whole condition database has to be searched. Accordingly, he first entry assistance apparatus 200 can search for candidates of estimation result in a reduced time, thus rendering the estimation speed improved.

In the example, it may be expected that the second entry assistance apparatus 200 is, similarly to the first entry assistance apparatus 200, frequently used by users in a senior age group in a certain time of day. The second apparatus 200 may therefore be rendered through learning to use the same condition database as the first entry assistance apparatus 200 in order to provide estimation. Consequently, the second assist apparatus 200 can simplify the calibration, and offer the content of the information to be presented to the user with the estimation accuracy improved similarly to the first entry assistance apparatus 200.

As described above, the entry assistance apparatus 200, thus configured as shown in FIG. 14, can extensively improve the accuracy in estimating the condition of the user and reduce the calibration costs. Note that the invention may not be restricted to the configuration of the entry assistance apparatus 200 shown in FIG. 14. For example, the communication unit 202 may not be essential, i.e. the apparatus 200 may be of stand-alone configuration without including the communication unit 202. Even with such a configuration, the entry assistance apparatus 200 can extensively improve the accuracy in estimating the condition of the user because of its learning function.

Processing performed by the present entry assistance apparatus 200 of the alternative embodiment will next be described in detail. The following description will be directed to the case the entry assistance apparatus 200 detects person condition information, entry state information and type-of-form information, as with the entry assistance apparatus 100 shown in and described with reference to FIG. 2. Also similarly to the entry assistance apparatus 100, the following description will be directed to the case the entry assistance apparatus 200 detects positional and postural information as person condition information and detects entry position and content information as entry state information.

Figure 16:
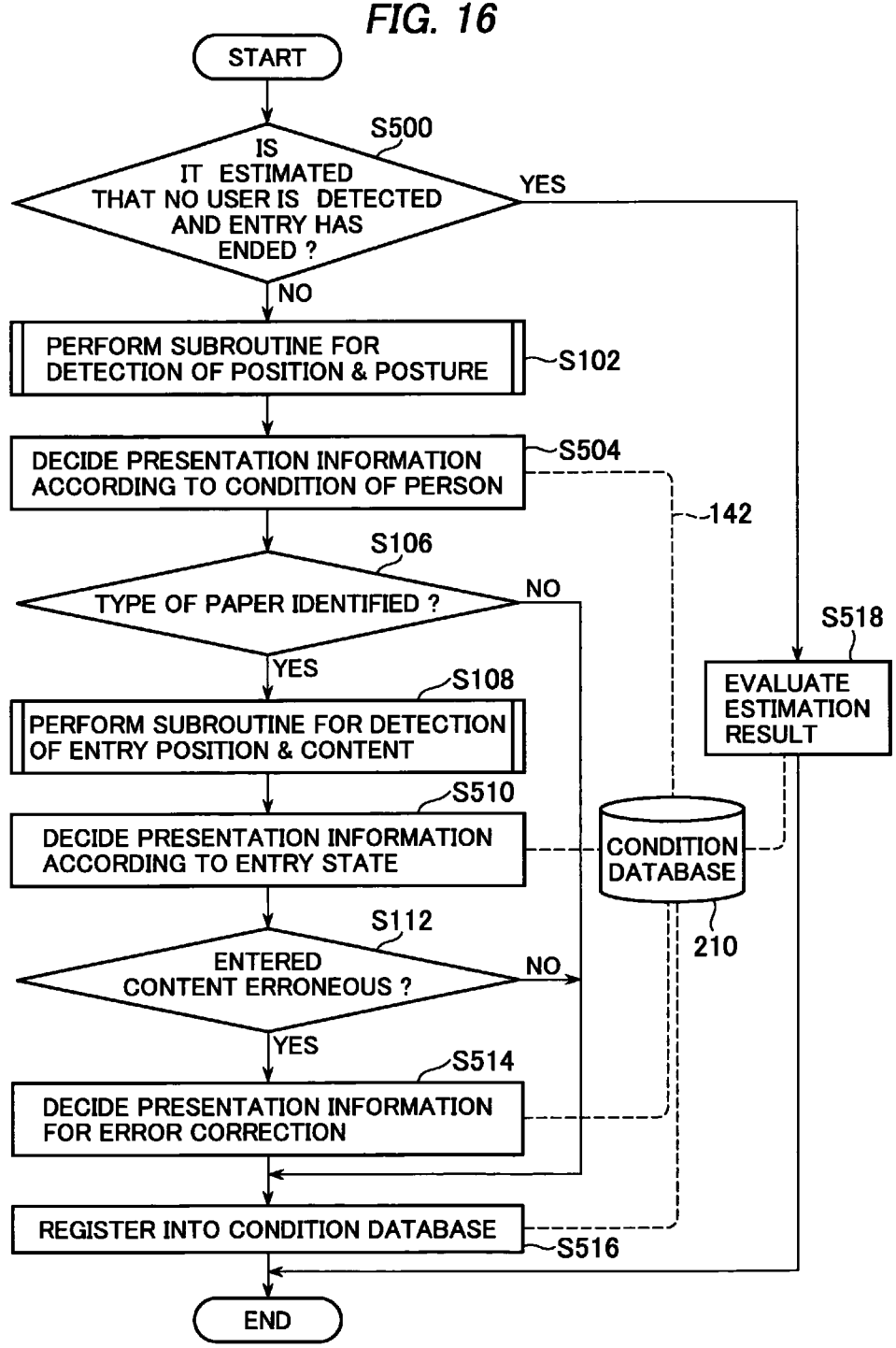
FIG. 16 is a general control flowchart, like FIG. 5, useful for understanding an example of sequence of operation performed by the entry assistance apparatus of the alternative embodiment.

Reference will now be made to FIG. 16, a flowchart illustrating one example of processing routine performed by the entry assistance apparatus 200. Similar steps may of course be designated with the same reference numerals. The routine shown begins, as one step period, with the state that the user was sensed and then fails to be sensed with entry estimated as ended. The figure also depicts the condition database 210, which may be included in the entry assistance apparatus 200 as shown in FIG. 14 or provided in an external device, such as a server.

In step S500, the entry assistance apparatus 200 makes a decision as to whether or not it is estimated that no user becomes sensed and the entry has ended.

If, in step S500, it is not determined that the estimation reveals that no user is sensed and the entry has ended, then the entry assistance apparatus 200 performs the subroutine S102 for detecting positional and postural information, as described earlier with reference to FIG. 5.

When the subroutine S102 for detecting positional and postural information is completed, the entry assistance apparatus 200 selects, based on the detected person condition information, presentation information to be presented according the condition of the user (S504). Then, the apparatus 200 presents, based on the selected presentation information, the content of, or indicated by, the presentation information to the user (presentation process (4)).

The entry assistance apparatus 200 performs the estimation process (2) and the presentation information selecting process (3) to thereby select presentation information. In the estimation process (2), the apparatus 200 refers to the condition database 210, as depicted with a dotted line 142, based on the person condition information, and takes account of a probability in estimating the condition of the user to thereby improve the accuracy in estimating the condition of the user, the probability being computed based on candidates of estimation result on the condition of the user. Like that, in FIG. 16, consultations with the database 210 are depicted with dotted lines.

If step S504 is completed, the entry assistance apparatus 200 makes a decision as to whether or not the type of paper form sheet has been identified (S106).

If, in step S106, it is not determined that the type has been identified, then the entry assistance apparatus 200 will proceed to step S516, which will be described later.

In step S106, if it is determined that the type has been identified, the entry assistance apparatus 200 performs the subroutine S108 for detecting entry position and content information, as described with reference to FIG. 5.

If the subroutine S108 for detecting entry position and entered content is completed, then the entry assistance apparatus 200 selects presentation information to be presented according to the entry state, based on entry state information (S510). The apparatus 200 presents, based on the presentation information thus selected, the content of, or indicated by, the presentation information to the user (presentation process (4)).

The entry assistance apparatus 200 thus performs the estimation process (2) and the presentation information selecting process (3) to thereby select presentation information. Similarly to step S504, the apparatus 200 refers, in the estimation process (2), to the condition database 210 based on the entry state information, and takes account of a probability in estimating the condition of the user, thus improving the accuracy in estimating the condition of the user.

If step S510 is completed, then the entry assistance apparatus 200 makes a decision as to whether or not the entered content is in error (S112).

In step S112, if it is not determined that the content is erroneous, the entry assistance apparatus 200 will then proceed to step S516, which will be described later.

In step S112, if the content is determined erroneous, then the entry assistance apparatus 200 selects information to be presented for error correction (S514), and presents the content of, or indicated by, the presentation information to the user (presentation process (4)). In step S514, the entry assistance apparatus 200 refers to the condition database 210 based on the entry state information, and takes account of a probability in estimating the condition of the user to thereby improve the accuracy in estimating the condition of the user.

If, in step S106, it is not determined that the type is identified, or, in step S112, it is not determined that the entered content is erroneous, or if step S514 is performed, then the entry assistance apparatus 200 performs an operation for registration into the condition database 210 (S516). The apparatus 200 terminates the routine illustrated in FIG. 16. If the user is sensed, then the routine shown in FIG. 16 will start again.

In step S500, if it is determined that no user is sensed and the entry is estimated as ended, then the entry assistance apparatus 200 proceeds to an operation S518 for evaluating the result of estimation, and will terminate the routine illustrated in FIG. 16.

The entry assistance apparatus 200 of the alternative embodiment thus makes evaluation through classification in terms of, in addition to person condition and entry state, time of day, circumstances under which the apparatus 200 is installed and the attributes of the user. The apparatus 200 may be adapted to make classification by means of a statistical classification scheme, such as a k-nearest neighbor algorithm, which may not restrict the processing in step S518. In that case, the entry assistance apparatus 200 provides estimation by using, in steps S102, S510 and S514, a probability that is computed by using detection information or classification results (having higher probabilities) corresponding to the detection information and additional information described earlier.

The entry assistance apparatus 200 thus performs the processing routine illustrated in FIG. 16 to thereby estimate the condition of the user who makes handwritten entry, and presents the content of the information corresponding to the estimation result to the user in a method appropriate for the estimation result. The apparatus 200 thus uses the condition database 210 for estimation in such a fashion that, if the condition of the user is estimated, the apparatus 200 updates the condition database based on the estimation result, so that the apparatus 200 learns the estimated condition of the user.

Accordingly, the entry assistance apparatus 200 yields, in addition to the advantages caused by the entry assistance apparatus 100, advantages of further improving the estimation accuracy than the apparatus 100 shown in FIG. 2.

The entry assistance apparatus 200 may communicate with another entry assistance apparatus 200, acting as an example of external device, so as to obtain the results of learning from the other entry assistance apparatus 200 to thereby reflect them on its condition database 210. Therefore, if the entry assistance apparatus 200 is not yet placed into practical use or has not learned much, the results of learning done by the other entry assistance apparatus 200 may be reflected on the condition database 210, thus simplifying the calibration process with estimation accuracy enhanced.

The present invention may not be restricted to the specific processing routine performed by the entry assistance apparatus 200 as illustrated in FIG. 16.

As described so far, the entry assistance apparatus 200 in accordance with the alternative embodiment is adapted for performing the processing, described earlier, starting with the detection process (1) and ending with the presentation process (4). The processing starting with the detection process (1) and ending with the presentation process (4), when executed by the entry assistance apparatus 200, allows the apparatus 200 to estimate the condition of the user who makes a handwritten entry and present the content of information appropriate for the result of estimation to the user in a way appropriate for the result of estimation. Thus, the entry assistance apparatus 200 does not let the user control presentation information, but rather can automatically display necessary information on intended sections on the display, hinder information to be concealed from being presented, and switch the way of presentation. Accordingly, the entry assistance apparatus 200 can appropriately assist the user in making handwritten entry of characters without changing the conventional way of handwritten entry.

The entry assistance apparatus 200 can thus enhance the convenience of the user in making handwritten entry.

The present invention has been described so far with reference to the particular, illustrative embodiments of entry assistance apparatus. The invention may not be restricted to such specific embodiments. The invention can be applied to various systems and equipment permitting the user to make handwritten entry, such as utility tables, wickets, desks and so forth in financial organizations and public institutions, for example.

The entry assistance apparatus according to the present invention may be applied to a variety of uses, such as maintaining the student in studying with his or her correct posture taken in educational organizations or general households, assisting, in households, the student in examination grind in presenting solutions according to circumstances of entry, and assisting plural designers in handwrite-designing or drafting road maps in general enterprises.

The entry assistance apparatus 100 or 200 in accordance with the illustrative embodiments may, at least partially, be implemented by a processor system, or computer, which is adapted to store and execute program sequences for causing the computer to function as the apparatus, thereby improving the convenience of the user when making handwritten entry. Such program sequences may be designed for controlling the processing starting with the detection process (1) and ending with the presentation process (4) described earlier, and/or for controlling the routines illustrated in FIGS. 5 and 16, for example.

Figure 17:
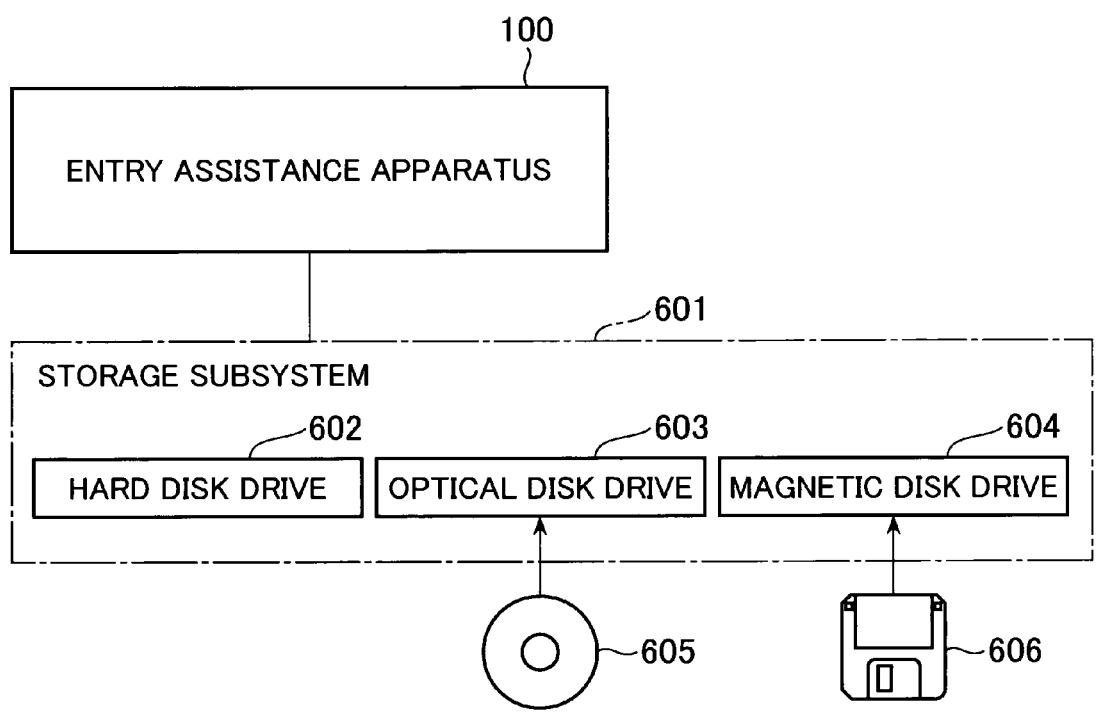
FIG. 17 is a schematic block diagram, like FIG. 2, showing one example of configuration of an entry assistance apparatus having program storage media in accordance with another alternative embodiment.

FIG. 17 schematically shows, in a block diagram, an example of configuration of the entry assistance apparatus 100/200 having such program sequences stored in a storage subsystem 601 for use in controlling the computer to function as the entry assistance apparatus. In the illustrative embodiment, the storage subsystem 601 may include a hard disk drive 602 adapted for storing the programs, an optical disk drive 603 for reading a storage medium having the programs stored, and a magnetic disk drive 604.

The storage media having programs stored thereon may be, in addition to the hard disk drive 620, a flexible disk 606, a magneto-optical disk, an optical disk 605 in the form of CD (Compact Disk)-ROM, CD-R (Recordable), CD-RW (Re-Writable), DVD (Digital Versatile Disk)-ROM, DVD-RAM, DVD-RW, or DVD+RW, a magnetic tape, a nonvolatile memory card, and a ROM. The programs may be downloaded to the hard disk drive 602 over a telecommunications network 500, FIG. 14.

While the present invention has been described with reference to the particular illustrative embodiments, it is not to be restricted by the embodiments. It is to be appreciated that those skilled in the art can change or modify the embodiments without departing from the scope and spirit of the present invention.

As described previously, the entry assistance apparatus in accordance with the illustrative embodiments is adapted to employ, as means for estimating the condition of the user, the range image sensor consisting of the laser range finder, the position sensor (positional information acquiring sensor) consisting of the pressure sensor, and infrared cameras for capturing shadow images formed on the desktop surface. The invention may not be restrictive to such specific means for estimating the condition of the user. The entry assistance apparatus may employ either of, or in combination, a solution using an array of plural cameras to acquire three-dimensional positions of a subject, a sensor array for detecting the distribution of heat sources, and a sensor array for sensing vibrations as means for estimating the condition of the user.

What I claim is:

1. An entry assistance apparatus for assisting a user in making a handwritten entry on a paper medium disposed on a surface, comprising:

a detector selection which detects, when the user makes the handwritten entry, person condition information about a condition of a body of the user, the person condition information including either or both of positional information regarding a position of the user and postural information regarding a posture of the user;

a condition estimator which estimates at least one condition of the user based on the person condition information;

a presentation information selector which selects, based on the at least one condition of the user, presentation information regarding at least one information content to be presented to the user; and an information presenter which presents the at least one information content indicated by the presentation information to the user, wherein said detector selection includes a center of gravity section that detects pressure values at a plurality of points within a region in which the user stands as one of entry state information on a state of the entry made by the user, the entry state information including the postural information regarding the user's position when making the entry, the detector selection additionally including at least one sensor to detect the content of the entry, the content of the entry comprising letters or characters that are recognized using at least one sensor, and wherein said detector selection further detects type-of-form information regarding the paper medium on the surface from below the surface using infrared rays, whereby said condition estimator uses the person condition information, the entry state information, and the type-of-form information to estimate the condition of the user.

2. The apparatus in accordance with claim 1, wherein said condition estimator contains a plurality of conditions regarding the condition of the body of the user and the state of the entry, and wherein said estimator uses the person condition information and the entry state information to determine whether or not each of the plurality of conditions is satisfied, and estimates the condition of the user based on a combination of results of the determination.

3. The apparatus in accordance with claim 1, wherein said presentation information selector has a priority set to the presentation information, and wherein said information presenter adjusts, when said presentation information selector has selected plural pieces of presentation information, an order of presentation and/or a way of presentation based on the priority set to the selected presentation information, and presents the presentation information accordingly.

4. The apparatus in accordance with claim 1, further comprising a condition learning section which manages a condition database containing condition data which include at least the person condition information and candidates for an estimation result regarding the condition of the user interrelatedly with each other, wherein said condition learning section uses the person condition information and consults with said condition database to identify the candidates for the estimation result based on the condition of the user corresponding to the person condition information, whereby said condition estimator estimates the condition of the user based on the candidates for the estimation result.

5. The apparatus in accordance with claim 4, wherein said condition estimator transfers the estimation result on the condition of the user to said condition learning section, and causes said condition learning section to register, update or delete the condition data in said condition database.

6. The apparatus in accordance with claim 4, further comprising a communication section communicating with an external device, wherein said condition learning section is responsive to said communication section having received a request transmitted from the external device to register, update or delete the condition data in said condition database.

7. A method of assisting a user in making handwritten entry on a paper medium disposed on a surface when the user uses an input tool supporting handwriting entry, said method comprising the steps of:

detecting person condition information on a condition regarding a body of the user when making the entry, the person condition information including either or both of positional information about a position of the user and postural information about a posture of the user;

estimating at least one condition of the user based on the person condition information;

selecting, based on the condition of the user, presentation information regarding at least one information content to be presented to the user; and presenting the at least one information content indicated by the presentation information to the user, wherein said detecting step comprises using a center of gravity sensor to detect pressure values at a plurality of points within a region in which the user stands as one of entry state information on a state of the entry made by the user, the entry state information including the postural information regarding the user's position when making the entry, wherein said detecting step additionally comprises using at least one sensor to detect the content of the entry, and wherein said detecting step further comprises detecting type-of-form information regarding the paper medium on the surface from below the surface using infrared rays, whereby said condition estimating step uses the person condition information, the entry state information, and the type-of-form information to estimate the condition of the user.

8. A non-transitory computer readable storage medium having a stored computer program which controls the computer, when executed on the computer, to function as an entry assistance apparatus for assisting a user in making a handwritten entry on a paper medium that is disposed on a surface with an input tool supporting handwriting entry, said program being capable of causing the computer to execute the steps of:

detecting person condition information on a condition regarding a body of the user when making the entry, the person condition information including either or both of positional information about a position of the user and postural information about a posture of the user;

estimating at least one condition of the user based on the person condition information;

selecting, based on the condition of the user, presentation information regarding at least one information content to be presented to the user; and presenting the at least one information content indicated by the presentation information to the user, wherein said step of detecting comprises using a center of gravity sensor to detect pressure values at a plurality of points within a region in which the user stands as one of entry state information on a state of the entry made by the user, the entry state information including postural information regarding the user's position when making the entry, wherein said detecting step additionally comprises using at least one sensor to detect the content of the entry, and wherein said detecting step further comprises detecting type-of-form information regarding the paper medium on the surface from below the surface using infrared rays, whereby said step of estimating uses the person condition information, the entry state information, and the type-of-form information to estimate the condition of the user.

9. The apparatus in accordance with claim 1, wherein the user makes the handwritten entry on a paper medium using an input tool that leaves a mark on the paper medium.

10. The apparatus in accordance with claim 9, wherein the input tool is a pen.

11. The method of claim 7, wherein the handwritten entry is made on a paper medium and the input tool leaves a mark on the paper medium.

12. The storage medium of claim 8, wherein the handwritten entry is made on a paper medium and the input tool leaves a mark on the paper medium.

13. The apparatus in accordance with claim 1, wherein the entry state information further includes the positional information.

14. The method in accordance with claim 7, wherein the entry state information further includes the positional information.

15. The storage medium in accordance with claim 8, wherein the entry state information further includes the positional information.

16. An entry assistance apparatus for assisting a user in making a handwritten entry on a surface or a paper medium on the surface, the entry having a content that includes letters or characters, wherein said entry assistance apparatus comprises:

a detector section which detects, when the user makes the handwritten entry, person condition information about a condition of a body of the user, the person condition information including either or both of positional information regarding the user's position when the user makes the entry and postural information regarding the user's posture when the user making the entry;

a condition estimator which estimates at least one condition of the user based on the person condition information;

a presentation information selector which selects, based on the at least one condition of the user, presentation information regarding at least one information content to be presented to the user; and an information presenter which presents the at least one information content indicated by the presentation information to the user, wherein said detector section includes a center of gravity sensor that detects pressure values at a plurality of points within a region in which the user stands as one of entry state information on a state of the entry made by the user, the entry state information including the postural information regarding the user's position when making the entry, the detector section additionally including at least one sensor to detect the content of the entry, whereby said condition estimator uses the person condition information and the entry state information to estimate the condition of the user.

\* \* \* \* \*